United States Patent
Toeroe et al.

(10) Patent No.: US 10,649,816 B2
(45) Date of Patent: May 12, 2020

(54) ELASTICITY ENGINE FOR AVAILABILITY MANAGEMENT FRAMEWORK (AMF)

(71) Applicant: Telefonaktiebolaget LM Ericsson (publ), Stockholm (SE)

(72) Inventors: Maria Toeroe, Montreal (CA); Neha Pawar, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 15/302,897

(22) PCT Filed: Apr. 10, 2014

(86) PCT No.: PCT/IB2014/060631
§ 371 (c)(1),
(2) Date: Oct. 7, 2016

(87) PCT Pub. No.: WO2015/155571
PCT Pub. Date: Oct. 15, 2015

(65) Prior Publication Data
US 2017/0031726 A1    Feb. 2, 2017

(51) Int. Cl.
*G06F 9/50* (2006.01)
*G06F 11/20* (2006.01)

(52) U.S. Cl.
CPC .......... *G06F 9/5083* (2013.01); *G06F 9/5072* (2013.01); *G06F 9/5077* (2013.01); *G06F 11/202* (2013.01)

(58) Field of Classification Search
CPC ........................................ G06F 9/45533–5094
See application file for complete search history.

(56) References Cited

U.S. PATENT DOCUMENTS 8,958,420 B1 * 2/2015 Shekhar .............. H04L 41/0896
                                                       370/384
9,495,211 B1 * 11/2016 Helstroom ................ G06F 9/50
(Continued)

OTHER PUBLICATIONS

The Service Availability™ Forum Specification for High Availability Middleware Timo Jokiaho, Fred Herrmann, Dave Penkler, Manfred Reitenspiess, Louise Moser (Year: 2003).*
(Continued)

*Primary Examiner* — Emerson C Puente
*Assistant Examiner* — Paul V Mills
(74) *Attorney, Agent, or Firm* — Sage Patent Group

(57) ABSTRACT

A method dynamically responds to a change in a workload managed by Availability Management Framework (AMF), where the workload is represented by a set of service instances (SIs) protected by a service group (SG) in a cluster. When receiving a notification of the workload change indicating an impacted SI in the set of SIs, the method applies at least one strategy from a collection of SG-level strategies and cluster-level strategies to adjust an amount of resources available to at least the impacted SI. Each SG-level strategy changes one or more configuration attributes within the SG according to a redundancy model used by the SG, and each cluster-level strategy changes one or more configuration attributes within the cluster according to one or more redundancy models used by SGs within the cluster. The method causes the AMF to apply a configuration change to respond to the workload change.

16 Claims, 14 Drawing Sheets

(56) References Cited

U.S. PATENT DOCUMENTS

| | | |
|---|---|---|
| 2008/0276119 A1 | 11/2008 | Barsness et al. |
| 2008/0307426 A1 | 12/2008 | Toeroe |
| 2010/0107172 A1 | 4/2010 | Calinescu et al. |
| 2011/0197198 A1 | 8/2011 | Kanso et al. |
| 2012/0102369 A1* | 4/2012 | Hiltunen ............... G06F 11/008 714/48 |
| 2012/0240129 A1 | 9/2012 | Kanso et al. |
| 2012/0317437 A1 | 12/2012 | Kanso et al. |
| 2014/0053158 A1 | 2/2014 | Kanso et al. |

OTHER PUBLICATIONS

Dynamic Scaling of Web Applications in a Virtualized Cloud Computing Environment Trieu C. Chieu, Ajay Mohindra, Alexei A. Karve and Alla Segal (Year: 2009).*

Managing Application Level Elasticity and Availability Maria Toeroe, Neha Pawar, Ferhat Khendek (Year: 2014).*

A Dynamic Provisioning Framework for Multi-tier Internet Applications in Virtualized Data Center* Yi Jin, Xu Liu, Jianfeng Zhan, Shuang Gao (Year: 2008).*

AMF Configurations: Checking for Service Protection Using Heuristics P. Salehi, F. Khendek, A. Hamou-Lhadj, M. Toeroe (Year: 2011).*

Adaptive Resource Management for Balancing Availability and Performance in Cloud Computing Ravi Jhawar and Vincenzo Piuri (Year: 2013).*

A cloud middleware for assuring performance and high availability of soft real-time applications Kyoungho An, Shashank Shekhar, Faruk Caglar, Aniruddha Gokhale, Shivakumar Sastry (Year: 2014).*

Service Availability Forum Application Interface Specification, Information Model Management Service, SAI-AIS-IMM-A.03.01, Sep. 30, 2011, pp. 1-202.

Service Availability Forum Application Interface Specification, Availability Management Framework, SAI-AIS-AMF-3.04.01, Sep. 30, 2011, pp. 1-452.

International Search Report from corresponding application PCT/IB2014/060631.

Peter Busschbach, Network Functions Virtualization Challenges and Solutions, Alcatel-Lucent White Papers, Dec. 31, 2013, 20 pages.

N. Zong et al., Problem Statement for Reliable Virtualized Network Function (VNF), Network Working Group, Internet Draft, draft-zong-vnfpool-problem-statement-01, Sep. 6, 2013, 13 pages.

* cited by examiner

ELASTICITY ENGINE FOR AVAILABILITY MANAGEMENT FRAMEWORK (AMF)

TECHNICAL FIELD

Embodiments of the invention relate to the availability management in response to changes in workload.

BACKGROUND

Elasticity is a key requirement and promise of cloud computing. It means that as the user demand for different services varies, the infrastructure providing these services expands and shrinks dynamically to accommodate the changing demand on one side while ensuring efficient resource utilization on the other. The infrastructure is expected to do so without impacting the availability of the services; that is, without causing any service outage. In general, the cloud services are believed to be "available" all the time.

However, today's cloud solutions generally address service availability and continuity at the level of virtual machines (VMs). When addressing the cloud elasticity at the VM level, the VM resources are either increased or decreased as needed. New VMs are created with the same applications on them and expected to serve the same users.

A solution addressing the domain of service availability and continuity is laid out in the Service Availability (SA) Forum specifications. In particular, it is the Availability Management Framework (AMF) which manages the availability of application services in the context of application failures. The specifications also define other middleware services providing a variety of tools (such as checkpoints, notifications, etc.) that an application developer can use to achieve this primary goal of service availability. The SA Forum specifications, however, do not explicitly address elasticity.

According to the SA Forum specifications, an AMF implementation performs its task (i.e., availability management) based on a configuration, which is a model that describes the applications in terms of AMF concepts. Based on the configuration, AMF manages the applications to maintain the availability of their services in spite of possible application component failures. To avoid single points of failure, an AMF configuration includes redundancy of the service provider entities (such as components and service units) that in case of failure take over the service provisioning under the orchestration of AMF. AMF configuration is managed via the Information Model Management service (IMM). IMM and the other SA Forum services are designed to support AMF and AMF managed applications.

The AMF specification specifies a set of redundancy models that define their appropriate strategies for protecting the services by the redundant provider entities. The redundancy models specify for AMF a scope—a pool of service providers—among which AMF can adjust the service assignments to compensate for any service provider entity going out of service. The event of a service provider going out of service can be perceived as shrinking the resource pool that AMF can use to provide the service. When the service provider entities are repaired and become available, AMF can use them again thus the pool expands. That is, AMF ensures the service provisioning while the resources scale up and down due to their operational status. The operational status of the service provider entities is a runtime feature that AMF evaluates on a continuous basis.

The elasticity addressed herein is driven by changes in user demands and resource utilization as opposed to failures and repairs addressed in the AMF specification. Currently, AMF does not react automatically to workload changes. As previously mentioned, the VM-level solutions propose to create new VMs in response to workload increase. However, AMF operates based on a configuration that it uses to manage the life-cycle of the application components, which means that an AMF managed application will not start just because a new VM becomes available. Furthermore, because AMF controls service assignments to application components, the workload associated with an application component cannot be associated with a VM as AMF may move the workload around as necessary. Thus, the existing VM-level solutions are deficient in addressing the elasticity issues arising from workload changes in an AMF managed application.

SUMMARY

According to one embodiment, a computer-implemented method is provided for dynamically responding to a change in a workload managed by AMF, wherein the workload is represented by a set of service instances (SIs) protected by a service group (SG) in a cluster. The method comprises: receiving a notification of the change in the workload indicating an impacted SI in the set of SIs; and applying at least one strategy from a collection of SG-level strategies and cluster-level strategies to adjust an amount of resources available to at least the impacted SI. Each SG-level strategy changes first one or more configuration attributes within the SG according to a redundancy model used by the SG, and each cluster-level strategy changes one or more configuration attributes within the cluster according to one or more redundancy models used by SGs within the cluster. The method causes the AMF to apply a configuration change to respond to the change in the workload.

According to another embodiment, a system is provided to dynamically respond to a change in a workload managed by AMF, wherein the workload is represented by a set of SIs protected by an SG in a cluster. The system comprises memory to store a configuration, and one or more processors coupled to the memory. The one or more processors are adapted to receive a notification of the change in the workload indicating an impacted SI in the set of SIs; apply at least one strategy from a collection of SG-level strategies and cluster-level strategies to adjust an amount of resources available to at least the impacted SI; and cause the AMF to apply a configuration change to respond to the change in the workload. Each SG-level strategy changes first one or more configuration attributes within the SG according to a redundancy model used by the SG, and each cluster-level strategy changes one or more configuration attributes within the cluster according to one or more redundancy models used by SGs within the cluster.

According to yet another embodiment, a system is provided to dynamically respond to a change in a workload managed by AMF, wherein the workload is represented by a set of SIs protected by an SG in a cluster. The system comprises an input module configured to receive a notification of the change in the workload indicating an impacted SI in the set of SIs; an adjustor module configured to apply at least one strategy from a collection of SG-level strategies and cluster-level strategies to adjust an amount of resources available to at least the impacted SI; and an output module configured to cause the AMF to apply a configuration change to respond to the change in the workload. Each SG-level strategy changes first one or more configuration attributes within the SG according to a redundancy model used by the SG, and each cluster-level strategy changes one or more configuration attributes within the cluster according to one or more redundancy models used by SGs within the cluster.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
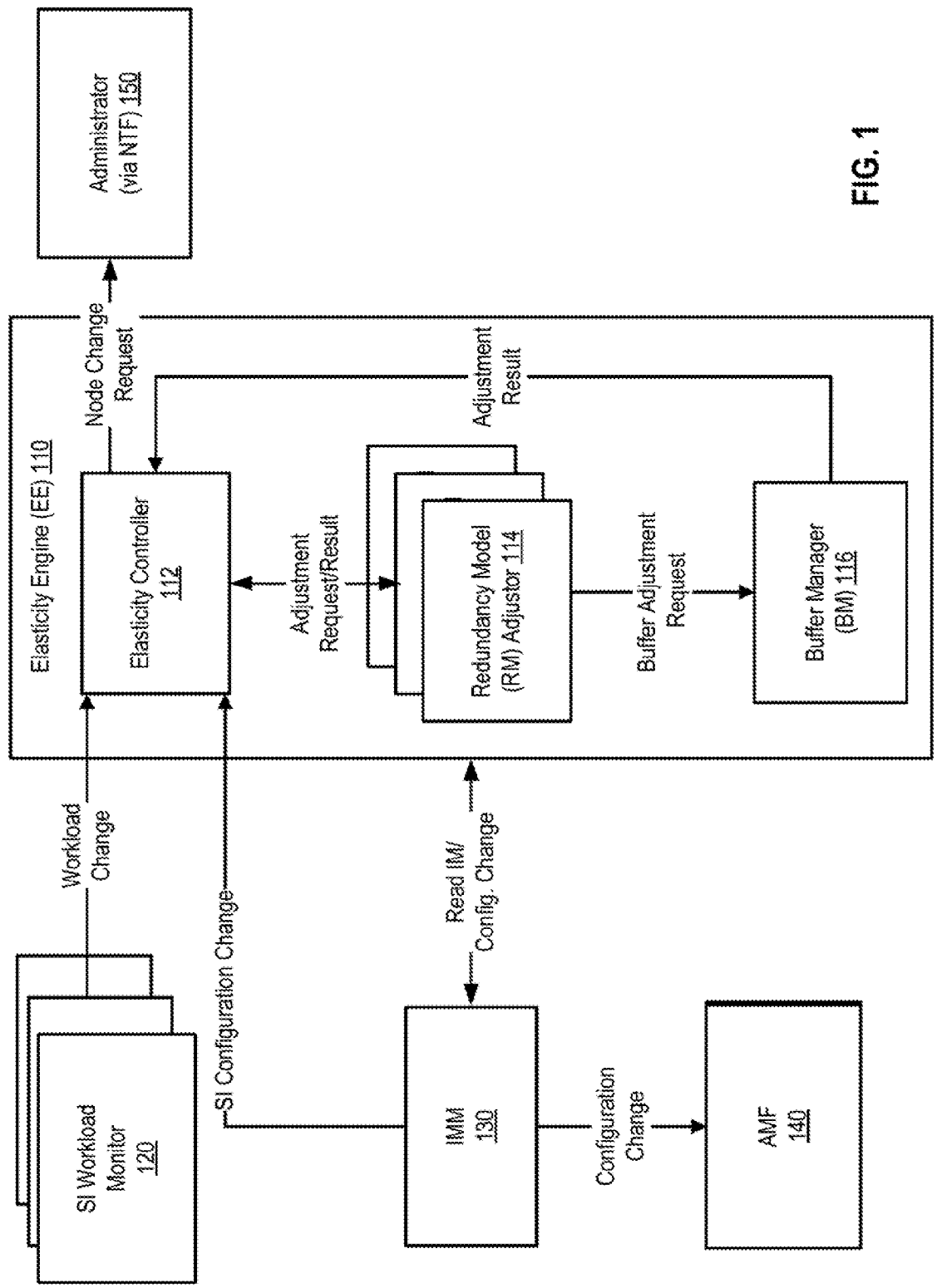
FIG. 1 illustrates a block diagram of an Elasticity Engine according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

AMF manages the high availability of services by coordinating the workload of application components according to redundancy models. AMF uses a configuration (also referred to as an AMF configuration) to protect the services. The configuration is a representation of the organization of the logical entities composing the application and the services under its control. The configuration is maintained by IMM. In an AMF configuration, the workload is represented by service instances (SIs) and component service instances (CSIs), while resources capable of serving these CSIs and SIs are represented by components and their aggregations; such as service units (SUs). At runtime, AMF assigns active and standby roles on behalf of the CSIs to components according to this configuration depending on the redundancy model that their SUs are participating within their service group (SG).

The actual workload represented by the SIs and their CSIs may vary over time, i.e., increase and decrease. The change in the workload can be viewed as a change in the workload represented by a single SI or as a change in the number of SIs. According to embodiments of the invention, an Elasticity Engine increases the amount of resources assigned to the SIs to satisfy their needs when the actual workload represented by these SIs increases; and frees up some of the resources for efficiency when the workload decreases. In order for AMF to react to workload changes, its configuration is changed to provide more resources for a service when the workload increases and reduce the resources allocation when the workload decreases. Thus, elasticity can be achieved through manipulating the AMF configuration.

The Elasticity Engine proposed herein adjusts the configuration of AMF appropriately in response to signals reporting workload changes. It changes the AMF configuration based on a set of strategies according to the redundancy model used for the SG protecting the impacted SI. The configuration adjustment can be made at the SG level (i.e., at the level of the impacted SG, which is the SG protecting the impacted SI), and/or at the cluster level (i.e., at the level of the cluster formed by the impacted SG and the other SGs sharing the nodes with the impacted SG). More specifically, the cluster-level strategy may focus on those SGs which have assignments on the same node on which the impacted SI is assigned. The cluster-level strategy may be used when the SG level adjustment cannot be made or is insufficient. By having the AMF configuration adjusted to the workload change, an AMF managed application can take advantage of new resources and free up unnecessary resources as the workload demand changes.

To allow a quick adjustment to the configuration, the Elasticity Engine may also use a number of buffers representing SUs at different levels of service readiness. In one embodiment, a buffer manager signals the system administration to allocate new nodes to accommodate workload increase, and remove nodes when the workload decreases.

The Elasticity Engine drives the AMF configuration adjustments for the different redundancy models (e.g., the 2N, N+M, N-way, N-way-Active and No-Redundancy redundancy models) that protect the services experiencing a workload change. The amount of adjustment is incremental as necessary. When the adjustment exceeds a threshold, the addition or removal of one or more nodes is triggered. Generally, the term "nodes" as used herein may represent physical hosts or virtual hosts such as virtual machines. In an embodiment where the added or removed node is a virtual machine managed by a cloud management system, the Elasticity Engine not only handles the elasticity issue in the AMF configuration, but also coordinates with the cloud management actions at the VM level to allow AMF to efficiently utilize cloud resources for service assignments.

In the following, two types of workload changes are described. The first type of workload change, SI-workload changes, occurs when the workload changes map to a single SI that already exists in the AMF configuration. For example, if an SI is defined as a Uniform Resource Locator (URL) through which users access a given service, an increase of user requests will map to the same SI. That is, the volume (or equivalently, the weight) of the workload represented by the SI has grown. Similarly, a decrease of user requests will map to the same SI; that is, the volume (or weight) of the workload represented by the SI has shrunk. The SI that experiences the workload increase or decrease is referred to as the impacted SI. In one embodiment, changes in the workload associated with a single SI are detected by a workload monitor, which informs the Elasticity Engine of the change.

The second type of workload change, SI-number changes, occurs when the change in the workload is due to an increase or a decrease in the number of SIs. The SI-number change is a configuration event, i.e., a new SI is added to or an existing SI is removed from the AMF configuration. The added SI or the removed SI is referred to as the impacted SI. The addition and removal of an SI is in association with an SG (also referred to as the impacted SG), which provides and protects the impacted SI. The SI-number can be changed by changing the AMF configuration in the IMM. In one embodiment, the Elasticity Engine receives a notification of the SI-number workload change from IMM.

FIG. 1 illustrates the architecture of the Elasticity Engine 110 according to one embodiment. For SI-number changes, SIs are added to or removed from the configuration via IMM 130, which notifies the Elasticity Engine 110 when this change occurs. The IMM Service maintains the AMF configuration and provides an interface for object managers to manage its content. AMF 140 receives the configuration changes from IMM 130 and reacts to them while coordinating the different entities to maintain service availability. If necessary, AMF 140 also updates the runtime attributes in IMM 130 to reflect the resulting changes.

In one embodiment, a workload monitor 120 monitors the workload associated with an SI and detects SI-workload changes. The workload monitor 120 informs the Elasticity Engine 110 of any significant change in the workload represented by the SI (e.g., exceeding a given threshold). When the Elasticity Engine 110 receives a signal from the workload monitor 120 indicating that the workload represented by an SI has increased or decreased, or from IMM 130 that SIs have been added to or removed from the configuration, the Elasticity Engine 110 calculates the configuration changes and creates an appropriate Configuration Change Bundle (CCB). The Elasticity Engine 110 sends the CCB to IMM 130, which in turn, informs AMF 140 of these changes (i.e., CCB). AMF 140 then executes the changes by rearranging the SI assignments as necessary. The Elasticity Engine 110 may also signal (e.g. via the Notification Service (NTF) as defined by the SA Forum, via an Application Programming Interface (API) towards the cloud management, etc.) to the system administrator 150 (e.g., the cloud manager) indicating the need for additional node(s) or their release.

In one embodiment, the Elasticity Engine 110 includes an Elasticity Controller 112, Redundancy Model (RM) Adjustors 114 (one for each redundancy model) and a Buffer Manager 116.

Figure 2:
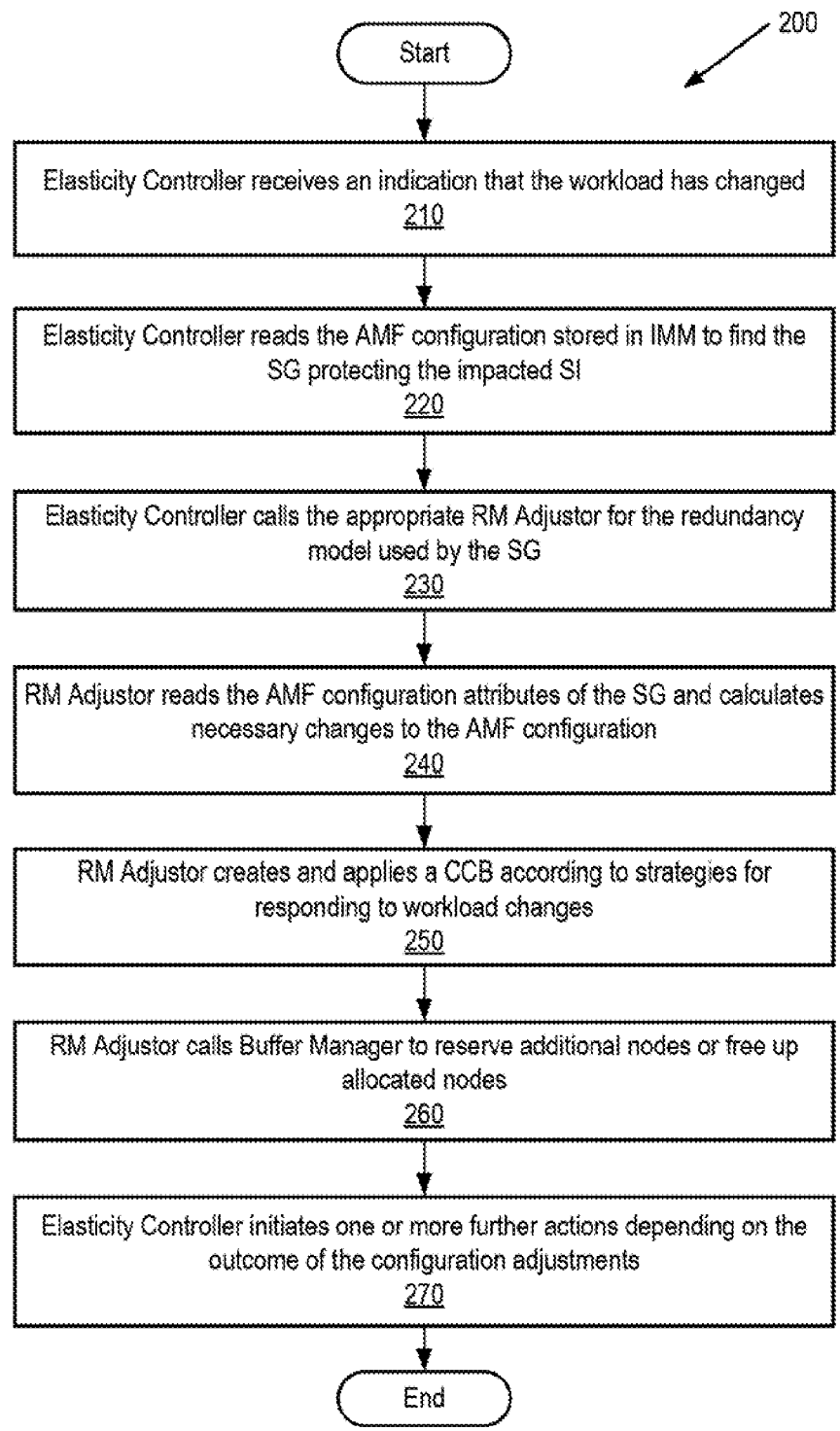
FIG. 2 is a flow diagram illustrating operations of the Elasticity Engine of FIG. 1 according to one embodiment.

FIG. 2 is a flow diagram illustrating operations of the Elasticity Engine 110 of FIG. 1 according to one embodiment. At a high level, the operation of the Elasticity Engine 110 begins when the Elasticity Controller 120 receives an indication that the workload has changed (210). The workload change occurs when there is an SI-workload change or an SI-number change. With respect to the SI-workload change, when the workload monitor 120 detects a significant change in the workload volume associated with an SI (e.g., when the increase or decrease in the incoming traffic exceeds a threshold), it signals the Elasticity Engine 110 to indicate a need for a configuration adjustment. With respect to the SI-number change, the Elasticity Engine 110 registers with IMM 130 to receive information about changes in the number of SIs in the AMF configuration. Depending on the IMM implementation, the Elasticity Engine 110 may take the role of an object implementer such as a CCB augmenter, or a CCB validator/applier.

Using the input, the Elasticity Controller 112 reads the AMF configuration stored in IMM 130 to find the impacted SG (220). The Elasticity Controller 112 then calls the appropriate RM Adjustor 114 for the redundancy model used by the SG (230).

The RM Adjustor 114 reads the AMF configuration attributes of the SG and calculates the necessary changes to the AMF configuration (240), so that additional workload is accommodated or excessive resource is freed up while availability is maintained. The RM Adjustor 114 creates and applies a CCB according to strategies for responding to workload changes (250). The strategies will be described later with reference to FIGS. 3-8.

To speed up future configuration adjustments, one or more nodes may be reserved for the affected SG. In one embodiment, the RM Adjustor 114 calls the Buffer Manager 116 to reserve additional nodes or free up allocated nodes (260). The Buffer Manager 116 may also use the CCB to implement these adjustments.

In some embodiments, depending on the outcome of the configuration adjustments, the Elasticity Controller 112 may initiate one or more of the following actions (270). For example, the Elasticity Controller 112 may initiate a similar configuration adjustment to other SGs collocated with the impacted SG if the adjustments to the impacted SG were insufficient. The Elasticity Controller 112 may signal the administrator or cloud manager to add more nodes if the cluster size is insufficient, or remove some existing nodes if those nodes were freed up. The Elasticity Controller 112 may request the administrator or software management to install software on additional nodes within the cluster if new nodes are added to accommodate the workload increase.

Each RM Adjustor 114 of the Elasticity Engine 110 handles workload changes for a redundancy model using one or more of the following strategies. The applicability of the strategies is dependent on the redundancy model of the involved SGs (i.e., the impacted SG and/or the SGs collocated with the impacted SG). The configuration may be adjusted at the SG level and/or at the cluster level.

If the SI workload monitor 120 reports an increase in the workload of an SI (i.e., SI-workload increase), the Elasticity Engine 110 will try to increase the capacity that this SI can use first at the SG level. If the SG-level increase cannot be made, it will try to adjust at the cluster level other SGs sharing capacity with the impacted SI.

Figure 3:
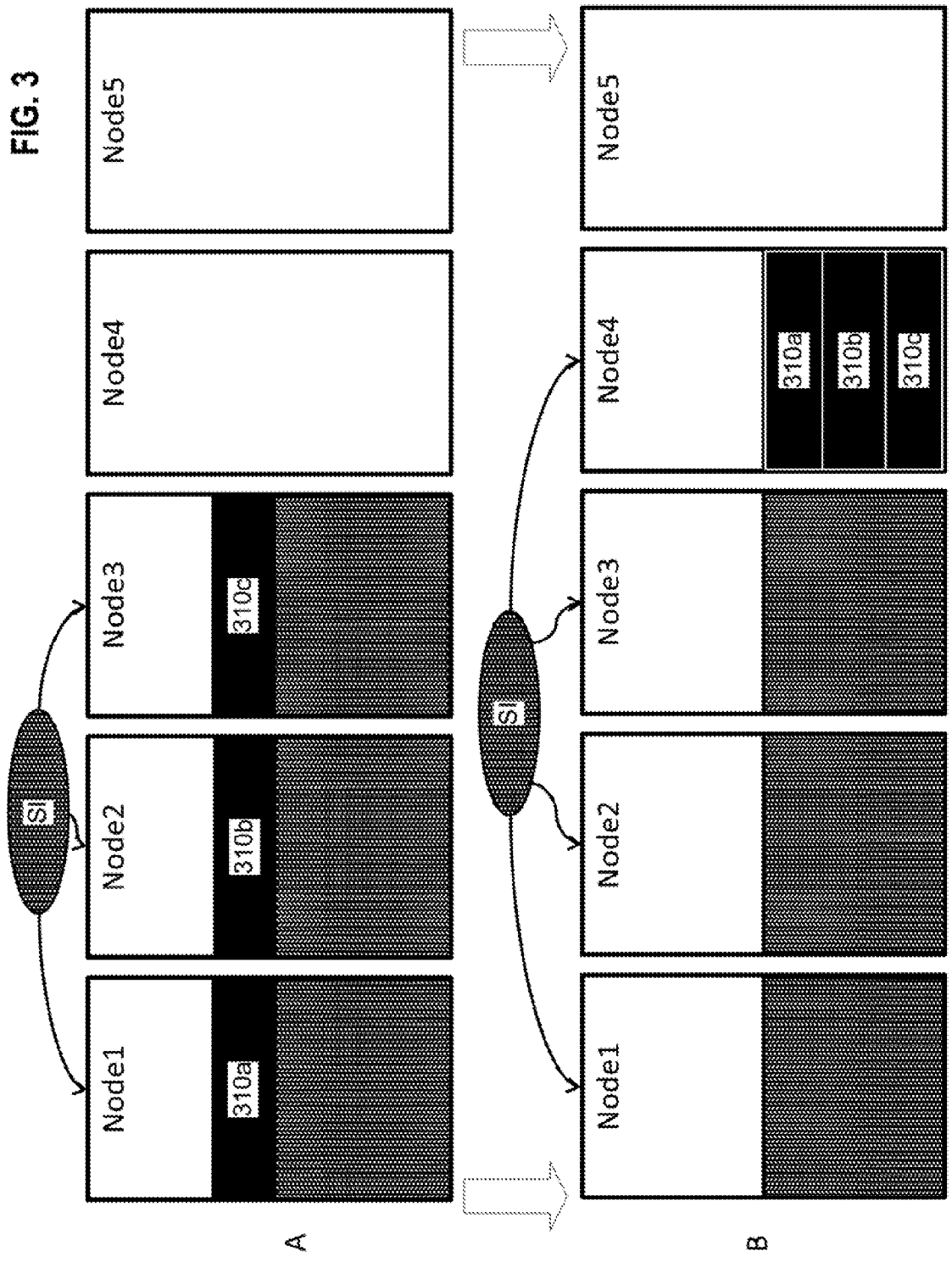
FIG. 3 illustrates an example of a first strategy for SI-workload increase by spreading the SI workload according to one embodiment.

A first strategy for handling the SI-workload increase is to spread the SI workload. The Elasticity Engine 110 uses this strategy when the impacted SG has the N-way-Active redundancy model. At the SG level, the Elasticity Engine 110 handles the increase of the workload of an SI by increasing the number of assignments of the SI, therefore spreading its workload across more SUs. The first strategy can be implemented by changing one or more configuration attributes of the impacted SI (e.g., the preferred number of assignments of the SI). FIG. 3 illustrates an example of the workload assignments of the impacted SI before (A) and after (B) AMF applies the configuration change. The configuration change increases the number of assignments for the impacted SI from three to four. In the example, the three black blocks (310a, 310b and 310c) indicate the increase in the workload of the impacted SI that is placed on each node. It is assumed that the impacted SG has SUs on each of the nodes in the example. The assignments are given to the SUs which result in the usage of the node resources.

The first strategy may also be applied to the cluster level, where the impacted SG may use any redundancy model and the other SGs sharing the nodes with the impacted SG use the N-way-Active redundancy model. By spreading those SGs' load on more nodes, their use of the shared node(s) decreases thus making more capacity available to the SI with the increased workload.

Figure 4:
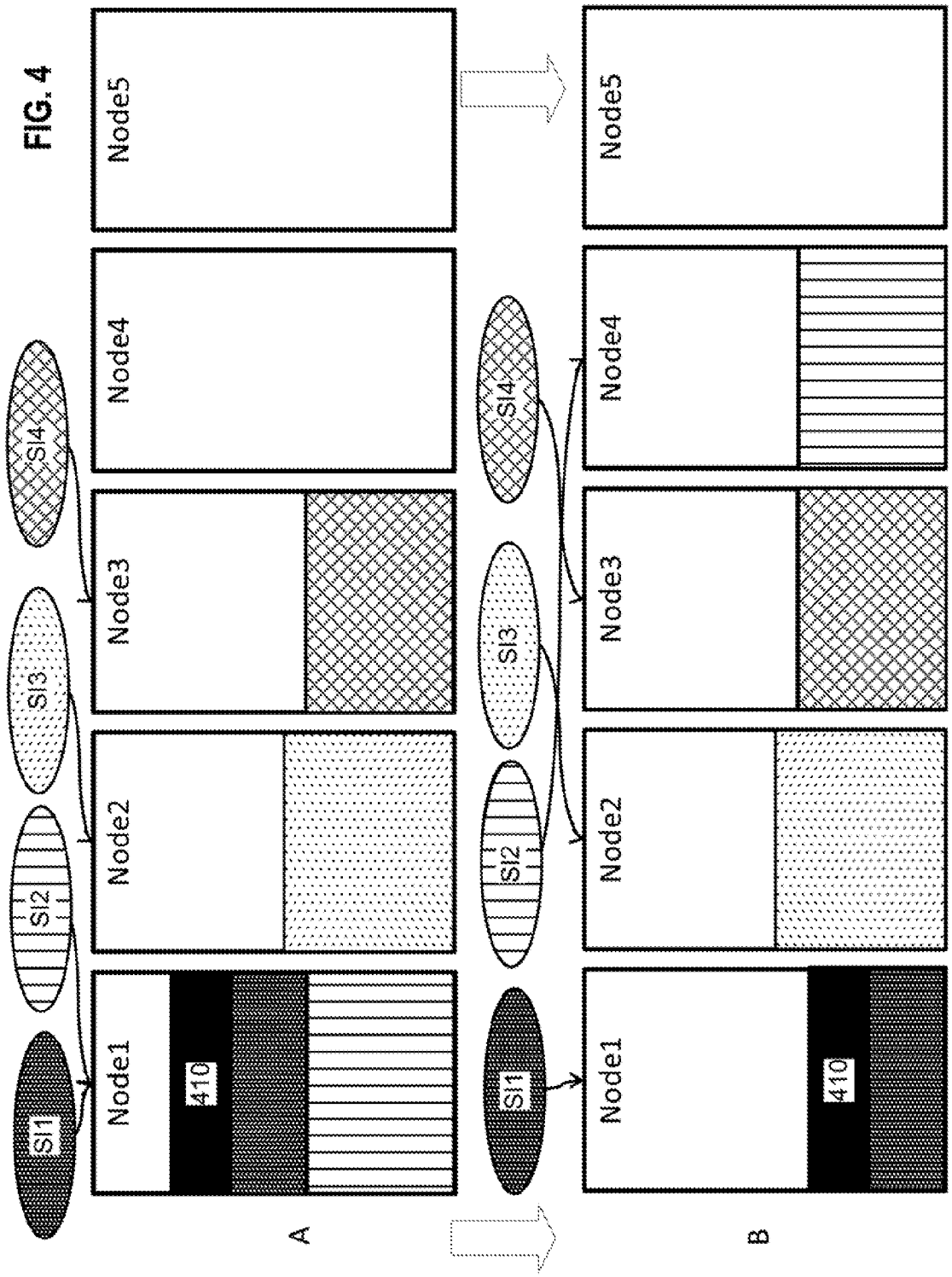
FIG. 4 illustrates an example of a second strategy for SI-workload increase by distributing SIs over more SUs according to one embodiment.

A second strategy is to distributing the SIs of an SG over more SUs within the SG. This strategy cannot be applied to the 2N and the No-Redundancy redundancy models. At the SG level the Elasticity Engine 110 may handle the SI-workload increase by distributing the SIs of the impacted SG to more SUs within the impacted SG, and therefore giving more capacity to each SI including the impacted SI. The second strategy can be implemented by changing one or more configuration attributes of the impacted SG; e.g., by changing the number of SIs that can be assigned to the SUs in the impacted SG. FIG. 4 illustrates an example of the workload distribution of the SIs before (A) and after (B) AMF applies the configuration change. The configuration change reduces the number of SIs that can be assigned to an SU from two to one. The workload increase in SD is indicated as a black block 410. The same strategy can be applied at the cluster level to other SGs sharing the node(s) with the impacted SI.

Figure 5:
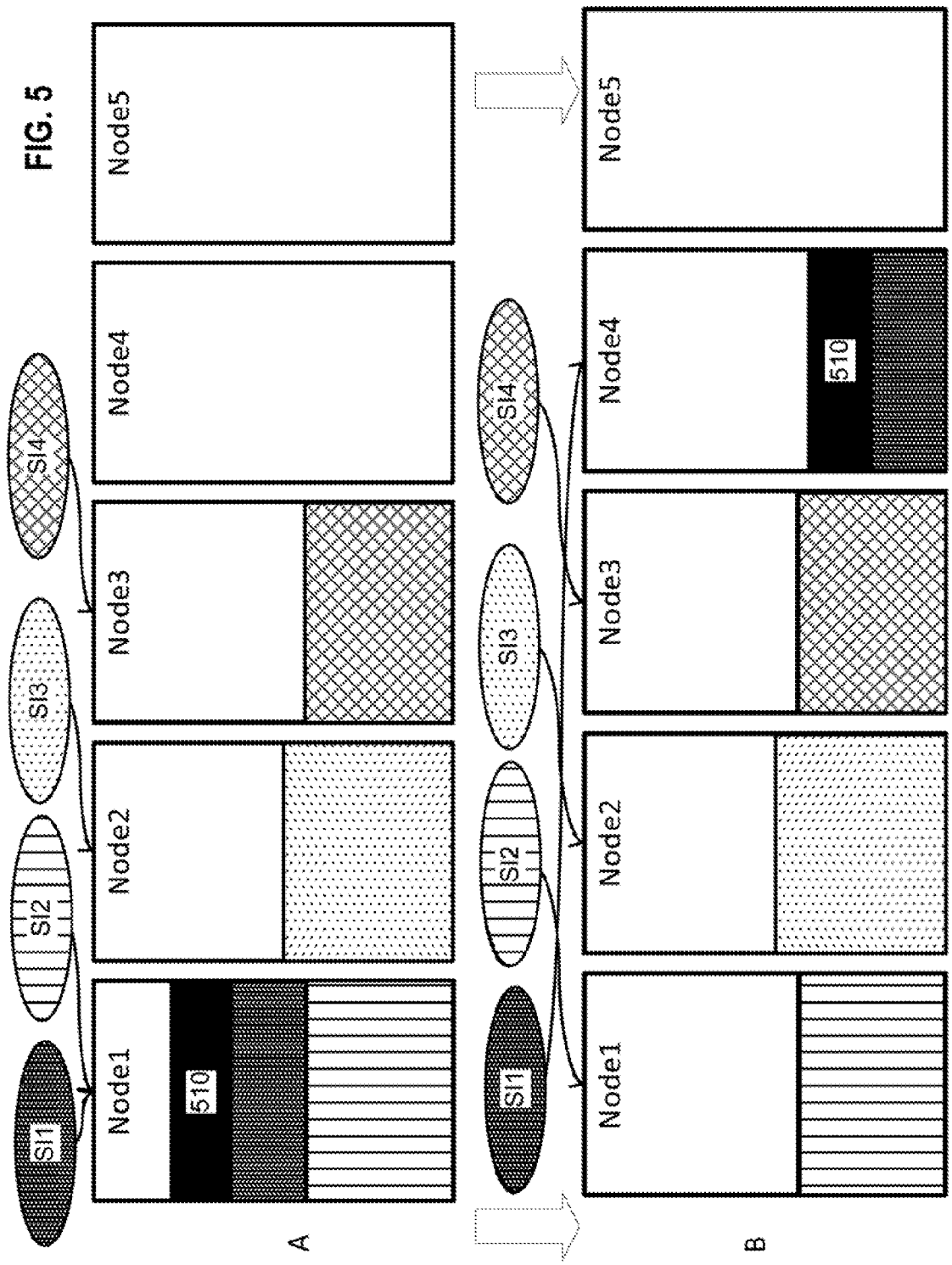
FIG. 5 illustrates an example of a third strategy for SI-workload increase by prioritizing the SU on the least loaded node according to one embodiment.

A third strategy is to prioritize the SU hosted on the least loaded node among those that host the SUs of the impacted SG. The Elasticity Engine 110 uses this strategy primarily when the impacted SG uses 2N or No-Redundancy redundancy model. However, this strategy may also be applied to other redundancy models. Using this strategy, the Elasticity Engine 110 may handle SI-workload increase by changing the ranking of the SUs in the impacted SG; more specifically, by swapping the rank of the SU currently active for the impacted SI with the rank of the SU on the least loaded node. The rank swapping causes AMF to move the assignment of the impacted SI and possibly other SIs to a node having more capacity available for the impacted SI. The third strategy can be implemented by changing one or more configuration attributes of the SUs in the impacted SG. FIG. 5 illustrates an example of the workload assignments of the SIs before (A) and after (B) AMF applies the configuration change according to the changed ranking. The workload increase in SI1 is indicated as a black block 510. In the example, Node1 is used to serve SI1 and SI2, which are protected by different SGs (e.g., SG1 and SG2, respectively). SG1 also has an SU (not shown) on Node4. Therefore, prioritizing SU4 causes AMF to move the assignment of SI1 from Node1 to Node4, where both nodes are used by SG1.

Alternatively or additionally, the third strategy can be applied to other SGs of the 2N or No-redundancy redundancy model that share the node capacity with the impacted SI.

When the workload of a single SI decreases (i.e., SI-workload decrease), the Elasticity Engine 110 frees up service capacity at the SG level first. Alternatively or additionally, the Elasticity Engine 110 may also free up service capacity at the cluster level. When the Elasticity Engine 110 handles the workload decrease, it frees one or more SUs of the impacted SG. By freeing up the SUs, the Elasticity Engine 110 may indirectly free up the nodes which host these SUs.

The Elasticity Engine 110 handles SI-workload decrease according to the redundancy model of the involved SGs. At the SG level this means the impacted SG; at the cluster level this means the SGs sharing the nodes with the impacted SI.

Figure 6:
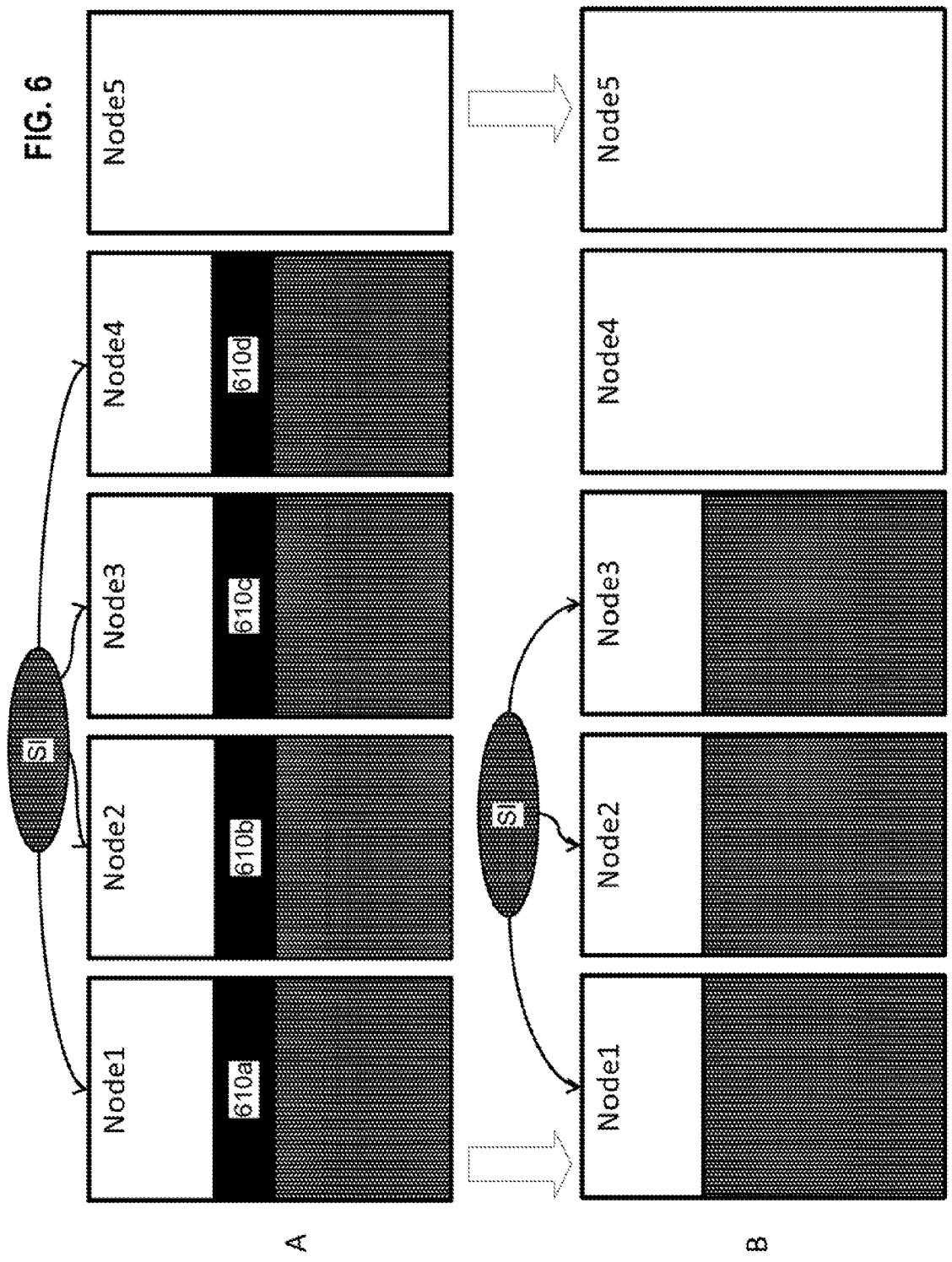
FIG. 6 illustrates an example of a first strategy for SI-workload decrease by merging the SI workload according to one embodiment.

The first strategy for handling SI-workload decrease is to merge the SI workload for SGs of the N-way-Active redundancy model. This strategy is the reverse to the first strategy for handling SI workload increase described above. At the SG level the Elasticity Engine 110 may handle the decrease of the workload of a single SI by decreasing its number of assignments and therefore distributing its workload to fewer SUs within the SG. This strategy can be implemented by changing one or more configuration attributes of the impacted SI. FIG. 6 illustrates an example of the workload assignments of the impacted SI before (A) and after (B) AMF applies the configuration change, in which the number of assignments for the impacted SI is reduced from four to three as a result of SI-workload decrease. The workload decrease in SI is indicated as four black blocks (610a, 610b, 610c and 610d). The reduction in the number of SI assignments frees up Node4 (a resource) while increasing the load on the other three nodes in use.

At the cluster level, the Elasticity Engine 110 may apply this first strategy to SGs of the N-way-Active redundancy model that share capacity with the impacted SI.

Figure 7:
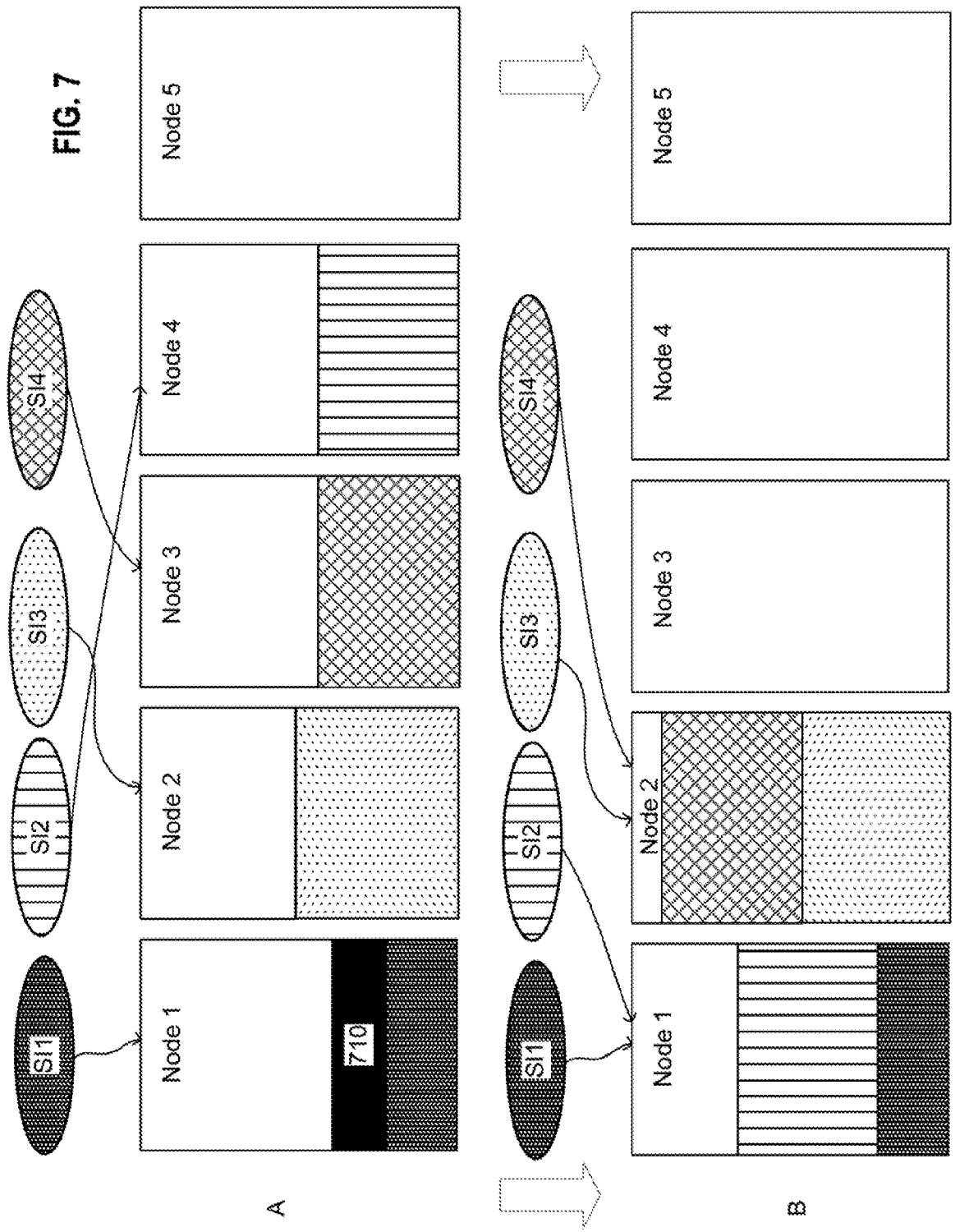
FIG. 7 illustrates an example of a second strategy for SI-workload decrease by re-grouping SIs over fewer SUs according to one embodiment.

The second strategy for handling SI-workload decrease is to re-group the SIs on fewer SUs of the impacted SG. This strategy cannot be applied to the 2N and the No-Redundancy redundancy models. At the SG level the Elasticity Engine 110 may handle the decrease of the workload of an SI by redistributing the SIs of the same SG to fewer SUs within that SG. Thus, the capacity provided to the SIs (including the impacted SI) is reduced, provided that all of the SIs allow for such a decrease. This is the reverse strategy to the second strategy for SI-workload increase. This strategy can be implemented by changing one or more configuration attributes of the impacted SG. FIG. 7 illustrates an example of the workload distribution of the impacted SI before (A) and after (B) AMF applies the configuration change. The workload decrease in SI1 is indicated as a black block 710. In this example, SI1, SI2, SI3 and SI4 are protected by SUs of SG1. Increasing the number of SIs that can be assigned to an SU from one to two allows AMF to collocate some assignments, while reducing the assigned SUs from four to two forces AMF to move the assignments of SI2 and SI4. The same strategy can be applied at the cluster level to other SGs sharing the nodes with SG1, so that the capacity freed up by the impacted SI can be used by SIs of the other SGs.

Figure 8:
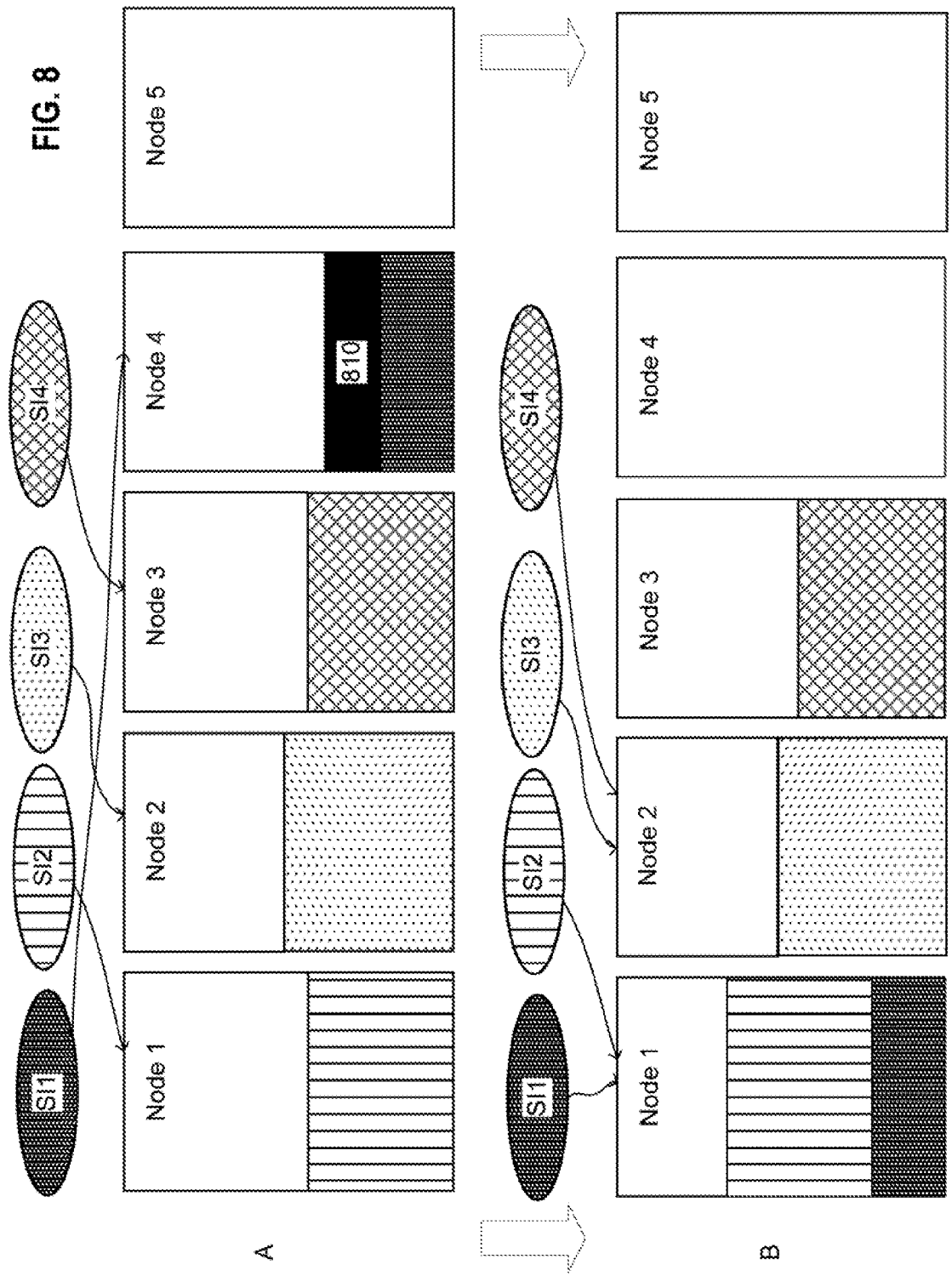
FIG. 8 illustrates an example of a third strategy for SI-workload decrease by prioritizing the SU on the node that serves other SIs according to one embodiment.

The third strategy for handling SI-workload decrease is to prioritize a node that serves other SIs protected by other SGs. The Elasticity Engine 110 uses this strategy primarily for SGs with the 2N or No-Redundancy redundancy model. However, this strategy may also be applied to other redundancy models. Using this strategy, the Elasticity Engine 110 may handle a decrease in the workload of an SI by swapping the rank of the SU currently active for the impacted SI with the rank of an SU on a node that has other assignments. The rank swapping causes AMF to move the impacted SI to the already loaded node. The third strategy can be implemented by changing one or more configuration attributes of the SUs in the impacted SG. FIG. 8 illustrates an example of the workload assignments of the SIs before (A) and after (B) AMF applies the configuration change according to the changed ranking. The workload decrease in SI1 is indicated as a black block 810. At the cluster level the same strategy can be applied to other SGs of the 2N or No-Redundancy redundancy model that share the node capacity with the impacted SI. In this case, the swapping is directed at the node serving the impacted SI that now can accommodate additional load. This is the reverse strategy to the third strategy for handling the SI-workload increase.

With respect to SI-number increase, the Elasticity Engine 110 may handle the increase in the number of SIs by first checking if the assignments of the new SI can be accommodated by the impacted SG. If yes, no action may be needed. If it is not the case, then the Elasticity Engine 110 tries to increase the number of SIs that the impacted SG can handle, e.g., by increasing the SG capacity.

The Elasticity Engine 110 may increase the capacity of an SG by increasing the number of SIs that each SU of the SG can handle. This is the only strategy that can be applied to the 2N redundancy model and it cannot be applied to the No-Redundancy redundancy model for SI-number increase. The number of SIs an SU can handle is limited by the capability model of the components of the SU. Since this change may decrease the capacity provided to the existing SIs, the Elasticity Engine 110 may follow up with applying one of the three aforementioned strategies for SI-workload increase appropriate for the redundancy model being used.

Alternatively, the Elasticity Engine 110 may increase the number of SUs handling the SI load within the impacted SG. This strategy can be used for the SGs of N-way-Active, N-way and N+M redundancy models and it is the only one applicable to the No-Redundancy redundancy model for SI-number increase.

The Elasticity Engine 110 adjusts to the decrease in the number of SIs by re-grouping the SIs on fewer SUs of the impacted SG, and therefore freeing up an SU of the impacted SG. It may do so using the second and/or third strategies for SI-workload decrease mentioned above.

With respect to buffer management, in one embodiment, additional SUs may be reserved as buffers to provide AMF with multiple levels of readiness for sudden changes of workload.

Figure 9:
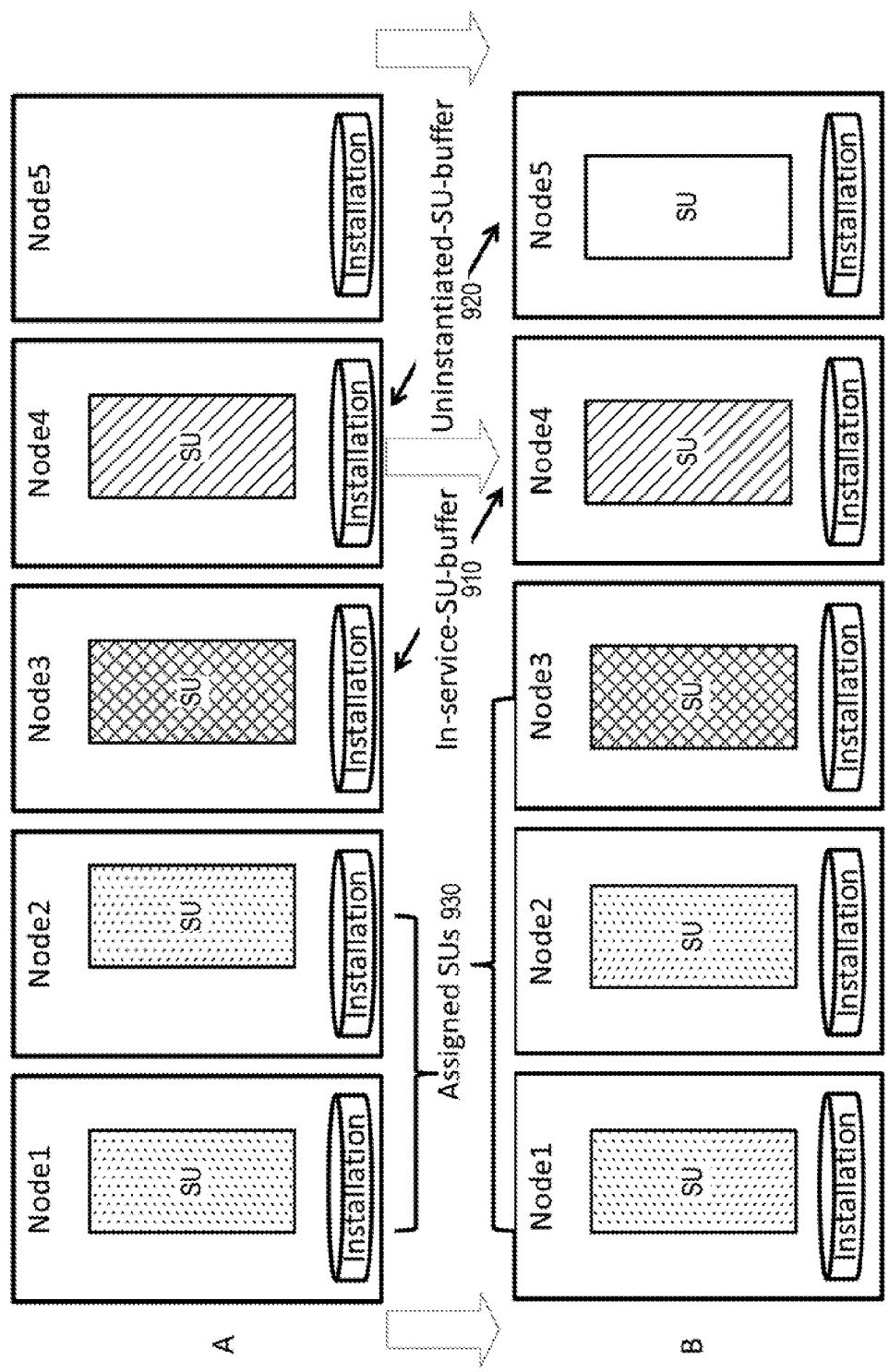
FIG. 9 illustrates an example of buffer management according to one embodiment.

FIG. 9 illustrates an example of using two buffers for managing workload changes according to one embodiment. The two buffers are in-service-SU-buffer 910 and the uninstantiated-SU-buffer 920. The in-service-SU-buffer 910 is formed by in-service SUs, which are SUs that have been instantiated and are ready to be used right away, but have no assignments. The size of the in-service-SU-buffer 910 is the difference between the number of in-service SUs and the number of assigned SUs 930. The number of assigned SUs 930 is the numbers of SUs that may have active and/or standby assignments. According to the SA Forum specifications, active and standby SUs exist only for the N+M and 2N redundancy models. The No-redundancy and N-way-active redundancy models only have active SUs, while for the N-way redundancy model an SU may have both active and standby assignments. The number of assigned SUs is directly configurable for the N-way and N-way-active redundancy models. It is indirectly configurable for N+M as the sum of the configurable numbers of active SUs and of standby SUs. For 2N redundancy model the number of assigned SUs is two, while for the no-redundancy redundancy model the number of assigned SUs is equal to the number of SIs protected by the SG. In one embodiment, the number of in-service SUs maintained in the buffer 910 is configurable. In a scenario where the instantiation time is acceptable (e.g., lower than a threshold), there may be zero in-service SUs in the buffer 901 because the SUs may quickly be brought into service when they are needed. The uninstantiated-SU-buffer 920 includes SUs that have been configured in the SG but have not instantiated by AMF yet. The number of uninstantiated SUs, i.e. the size of the uninstatiated-SU-buffer 920 is difference between the number of SUs configured in the SG and the number of in-service SUs. As the Elasticity Engine 110 changes the number of assigned SUs 930, it may also adjust a number of attributes to maintain desired buffer sizes.

FIG. 9 illustrates a scenario in which the number of assigned SUs 930 of an SG increases from two (A) to three (B). When the Elasticity Engine 110 increases the number of assigned SUs 930, it also prepares for possible sudden workload increase by bringing into service some additional SUs for the in-service-SU-buffer 910. The Elasticity Engine 110 can increase the number of in-service SUs only if there is at least one additional SU configured in the SG; i.e., only when there is at least one uninstantiated spare SU in the uninstantiated-SU-buffer 920. For example, the SU hosted on Node4 was brought from the uninstantiated-SU-buffer 920 (A) into the in-service-SU-buffer 910 (B) after an increase in the assigned SUs 930.

A new SU can be configured if there is a node in the node group configured for the SG that currently does not host an SU (e.g., Node5 in A). Otherwise, new nodes are needed with the necessary software installed on them. In one embodiment, the Elasticity Engine 110 may signal the need for a new node to the system administration, for example, by generating a notification.

In one embodiment, the size of these buffers (the in-service-SU-buffer 910 and the uninstantiated-SU-buffer 920) depends on the relation of the targeted speed of adjustment, the speed of increase of the workload handled by the SG and the time needed to instantiate an SU.

In case of a decrease in the workload, the Elasticity Engine 110 may free up nodes by decreasing the number of assigned SUs 930. The SUs that are freed up as a result of this decrease are kept in the in-service buffer 910. If the nodes are successfully freed up, the Elasticity Engine 110 also decreases the number of in-service SUs while maintaining the in-service-SU-buffer 910. In one embodiment, the Elasticity Engine 110 may also decrease the number of configured SUs provided that the uninstantiated-SU-buffer 920 is maintained.

Before proceeding to the examples of applying workload change strategies, it is useful to know the AMF configuration attributes related to workload assignments. AMF entities such as SIs, SUs, SGs, and the like, are described in the AMF configuration as objects, and their attributes of the classes are defined by the AMF specification. The attributes are either configuration (read-only or writable) attributes or runtime attributes. Object managers (e.g., configuration designer, administrator, management application, etc.) set the configuration attributes, while the runtime attributes are set by AMF in response to the configuration. AMF receives the changes in the configuration attributes and reacts to the change, while maintaining service availability through the re-assignments of SIs to SUs whenever necessary. By modifying the values of the writable configuration attributes, AMF can be forced to change the SI to SU assignments.

The elasticity-related configuration attributes that are writable are referred to as elasticity attributes. Table 1 in the following lists examples of the elasticity attributes for the service provider side. The table also describes where these attributes are applicable.

TABLE 1

Service Provider Side Attributes
SERVICE PROVIDER SIDE

| | |
|---|---|
| saAmfSGAutoAdjust:SaBoolT[0 . . . 1] = saAmfSGType.saAmfSgtDefAutoAdjust {CONFIG, WRITABLE, SAUNT32T} | If set to SA_TRUE, AMF auto-adjusts the assignments of SIs to the SUs of the SG to match the preferred configuration. |
| saAmfSGNumPrefActiveSUs:SaUnit32 T[0 . . . 1] = 1{CONFIG, WRITABLE} | This attribute is only applicable for the N + M redundancy model. It represents the preferred number of "active" SUs in the SG. |
| saAmfSGNumPrefStandbySUs:SaUnit3 2T[0 . . . 1] = 1{CONFIG, WRITABLE} | This attribute is only applicable for the N + M redundancy model. It represents the preferred number of "standby" SUs in the SG. |
| saAmfSGNumPrefAssignedSUs:SaUnit 32T[0 . . . 1] = saAmfSGNumPrefInserviceSUs {CONFIG, WRITABLE} saAmfSGNumPrefInserviceSUs:SaUnit 32T[0 . . . 1] = Number of SUs{CONFIG, WRITABLE} | This attribute is only applicable for the N-way, and N-way-Active redundancy models. It represents the preferred number of SUs with assignments in the SG. This attribute is greater than or equal to 2 in the case of 2N, greater than or equal to the sum of saAmfSGPrefNumActiveSUs and saAmfSGPrefNumStandbySUs in the case of N + M, and greater than or equal to saAmfSGPrefAssignedSUs in the case of N-way and N-way-Active redundancy models. It represents the preferred number of SUs in the SG that are in the "in-service" readiness state. |
| saAmfSGMaxActiveSIperSU: SaUnit32T[0 . . . 1] = 0 (No limit){CONFIG, WRITABLE} | This attribute specifies the maximum number of SIs that can be assigned in the HA active state to an SU of the SG. This attribute is only applicable to N + M, N-way, and N-way-Active redundancy models. |
| saAmfSGMaxStandbySIperSU: SaUnit32T[0 . . . 1] = 0 (No limit){CONFIG, WRITABLE} | This attribute specifies the maximum number of SIs that can be assigned as standby to an SU of the SG. This attribute is only applicable to N + M and N-way redundancy models. |
| saAmfNodeCapacity: SaString[0 . . . *] = Empty{CONFIG, WRITABLE} | This attribute specifies the capacity of the node that can be used for SI assignments. |
| saAmfSURank:SaUnit32T[0 . . . 1] = 0{CONFIG, WRITABLE} | This is used to specify the order in which SUs are selected for instantiation. The rank can also be used to determine the order in which an SU is selected for SI assignments, when no other configuration attribute defines it. |

Table 2 lists examples of the elasticity attributes for the service sides, and describes where these attributes are applicable.

TABLE 2

Service Side Attributes
SERVICE SIDE ATTRIBUTES

| | |
|---|---|
| saAmfSIRank: SaUnit32T[0 . . . 1] = 0{CONFIG, WRITABLE} | SI rank is used to specify the order in which SIs are selected for the assignment. |
| saAmfSIPrefActiveAssignments: SaUnit32T[0 . . . 1] = saAmfSIProtectedbySG. saAmfSGNumPrefAssignedSUs {CONFG, WRITABLE} | This attribute represents the preferred number of active assignments per SI in the N-way-Active redundancy model. It is not applicable for the other redundancy models. |
| saAmfSIPrefStandbyAssignments: SaUnit32T[0 . . . 1] = 1{CONFG, WRITABLE} | This attribute represents the preferred number of standby assignments per SI in the N-way redundancy model. It is not applicable for the other redundancy models. |
| saAmfSIActiveWeight: SaStringT [0 . . . *] = saAmfSvcType.saAmfSvcDefActiveWeight {CONFG, WRITABLE} | The weight for an active assignment of this SI. |
| saAmfSIStandbyWeight: SaStringT [0 . . . *] = saAmfSvcType.saAmfSvcDefStandbyWeight {CONFG, WRITABLE} | The weight for a standby assignment of this SI. |
| saAmfRank: SaUnit32T[1]{CONFIG, WRITALE} | This attribute is used to specify the ranked list of SUs per SI which is required for the N-way and N-way-Active redundancy models |

AMF uses the values of these attributes to determine the SI to SU assignments. Changing the values of these attributes changes the distribution of SI assignments within the SG, therefore re-distributes the workload among the SUs in the SG. The Elasticity Engine 110 focuses on managing the elasticity of AMF managed applications through their AMF configuration while maintaining the availability of their services.

The Elasticity Engine 110 translates for AMF any change in the workload into modifications of the AMF elasticity attributes, such as the ones listed above. AMF deploys these configuration changes in the system upon receiving them. The Elasticity Engine 110 only makes valid changes to an AMF configuration to maintain its validity throughout the modifications. Thus, before the Elasticity Engine 110 changes the value of an elasticity attribute, it checks the following constraints for that elasticity attributes.

The elasticity attribute saAmfSGNumPrefActiveSUs has the following constraints.
  It is only applicable to the N+M redundancy model.
  The following inequality is maintained: saAmfSGNumPrefActiveSUs+ saAmfSGNumPrefStandbySUs<=saAmfSGNumPrefInserviceSUs.
  The number of active SUs is sufficient to accommodate all SIs, that is: saAmfSGNumPrefActiveSUsx saAmfSGMaxActiveSIsperSU<=number of SIs protected by the SG.
  Its value is not less than 1.

The elasticity attribute saAmfSGNumPrefStandbySUs has the following constraints.
  It is only applicable to the N+M redundancy model.
  The following inequality is maintained: saAmfSGNumPrefActiveSUs+ saAmfSGNumPrejStandbySUs<=saAmfSGNumPrefInserviceSUs.
  The number of standby SUs is sufficient to protect all SIs, that is: saAmfSGNumPrefStandbySUsx saAmfSGMaxStandbySIsperSU<=number of SIs protected by the SG.
  Its value is not less than 1, unless the value was set to 0 in the initial configuration and remains 0.

The elasticity attribute saAmfSGNumPrefInserviceSUs has the following constraints.
  Its value is not more than the configured number of SUs.
  The applicable one of the following inequalities is maintained while its value is decreased: saAmfSGNumPrefActiveSUs+ saAmfSGNumPrefStandbySUs<=saAmfSGNum PrefInserviceSUs, or saAmfSGNumPrefAssignedSUs<=saAmfSGNum PrefInserviceSUs.

The elasticity attribute saAmfSGNumPrefAssignedSUs has the following constraints.
  It is only applicable to N-way and N-way-Active redundancy model.
  Its value is less than or equal to the number of preferred in-service SUs, that is: saAmfSGNumPrefAssignedSUs<=saAmfSGNum PrefInserviceSUs.
  Its value is not less than the number of assignments of the each of the SIs, that is: saAmfSIPrefActiveAssignments<=saAmfSGNum PrefAssignedSUs, or saAmfSIPrefStandbyAssignments+1<=saAmfSGNumPrefAssignedSUs.
  Its value is not less than the number of SUs protecting the preferred number of active and standby assignments of the each of the SIs that the SG needs to protect, that is: Sum (saAmfSIPrefActiveAssignments$_i$)<=saAmfSGNumPrefAssignedSUs×saAmfSGMaxActiveSIsperSU, or Sum (saAmfSIPrefStandbyAssignments$_i$+1)<=saAmfSGNumPrefAssignedSUs× saAmfSGMaxStandbySIsperSU.

The elasticity attribute saAmfSGMaxActiveSIsperSU has the following constraints.
  Its value is not more than what can be supported by the component capability models of the components in each of the SUs.
  Its value may be decreased in accordance with the applicable one of the following inequalities: SaAmfSGMaxActiveSIsperSU× SaAmfSGNumPrefAssignedSUs>=Sum (saAmfSIPrefActiveAssignments$_i$), or SaAmfSGMaxActiveSIsperSU× SaAmfSGNumPrefActiveSUs>=the number of SIs protected by the SG.

The elasticity attribute saAmfSGMaxStandbySIsperSU has the following constraints.
  Its value is not more than what can be supported by the component capability models of the components in each of the SUs.
  Its value may be decreased in accordance with the applicable one of the following inequalities: SaAmfSGMaxStandbySIsperSU× SaAmfSGNumPrefAssignedSUs>=Sum (saAmfSIPrefStandbyAssignments$_i$), or SaAmfSGMaxStandbySIsperSU× SaAmfSGNumPrefStandbySUs>=the number of SIs protected by the SG.

The elasticity attribute saAmfSIPrefActiveAssignments has the following constraints.
  This attribute is used for controlling the workload only in case of the N-way-Active redundancy model.
  Its value may be increased only if the SI needing capacity is not assigned yet to all the SUs in the SG and the following inequalities are satisfied: saAmfSINumPrefActiveAssignments<=saAmfSG NumPrefAssignedSUs, and saAmfSGMaxActiveSIsperSU×saAmfSGNumPrefAssignedSUs>=Sum (saAmfSIPrefActiveAssignments$_i$).
  Its value is more than or equal to 2.

Figure 10:
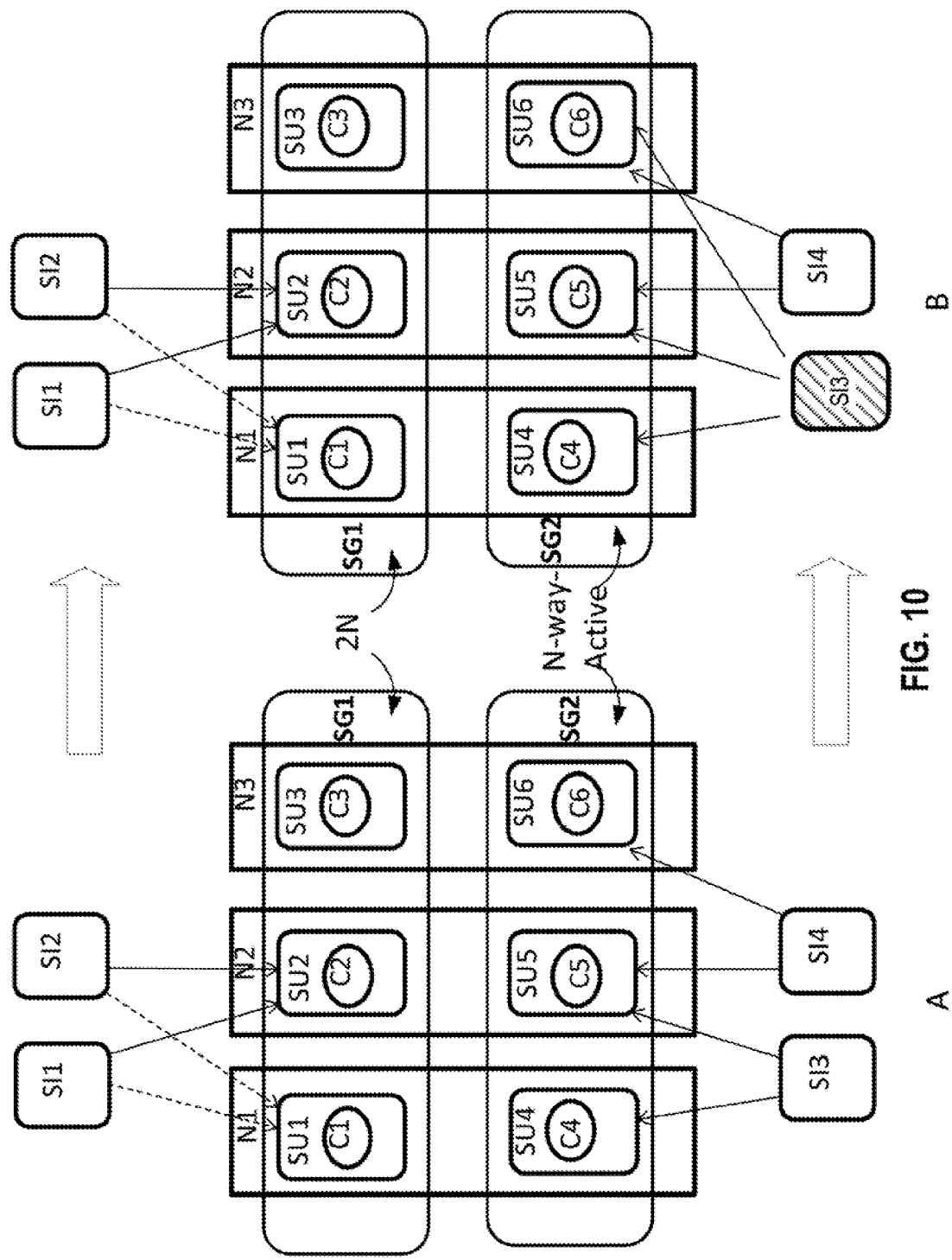
FIG. 10 illustrates an example of using the first strategy of FIG. 3 for handing SI-workload increase according to one embodiment.

A number of examples are provided below to illustrate the configuration change in response to a workload change. FIG. 10 illustrates an example of configuration change according to one embodiment.

In this example, the configuration of SG1 and SG2 are as follows:

| SG1 | | |
|---|---|---|
| | Redundancy Model | 2N redundancy model |
| | Ordered List of SUs in SG | {SU2, SU1, SU3} |
| | Ordered List of SIs | {SI1, SI2} |
| | saAmfSGNumPrefInserviceSUs | 3 |
| | saAmfSGMaxActiveSIsperSU | 2 |
| | saAmfSGMaxStandbySIsperSU | 2 |
| | saAmfSGAutoAdjust | SA_TRUE |
| | Component capability model | 2_active_or_2_standby |

| SG2 | | |
|---|---|---|
| | Redundancy Model | N-way-Active redundancy model |
| | Ordered List of SUs in SG1 | {SU4, SU5, SU6} |
| | Ordered List of SIs | {SI3, SI4} |
| | saAmfSGNumPrefInserviceSUs | 3 |

| | |
|---|---|
| saAmfSGMaxActiveSIsperSU | 2 |
| saAmfSGAutoAdjust | SA_TRUE |
| Component capability model | 2_active |
| SI3.saAmfSIPrefActiveAssignments | 2 |
| SI4.saAmfSIPrefActiveAssignments | 2 |

Assume that in the above configuration the workload represented by SI3 increases. Referring also to FIG. 1, the Elasticity Controller 112 of the Elasticity Engine 110 receives this signal for SI3 and determines that SI3 is protected by SG2, which has the N-way-Active redundancy model. The Elasticity Controller 112 then calls the RM Adjustor 114 for N-way Active.

The RM Adjustor 114 uses the first strategy of SI-workload increase described before to spread the SI workload. Accordingly, the RM Adjustor 114 checks a first condition: whether SI3 of SG2 is using the capacity on all the SUs of SG2; i.e., whether SI3.saAmfSIPrefActiveAssignments is less than SG2.saAmfSGNumPrefAssignedSUs. If it is less, then the RM Adjustor 114 also checks a second condition: whether SG2 has sufficient capacity to accommodate a new assignment for SI3. It checks the second condition by calculating the total number of SI assignments requested on the service side, which is the sum of saAmfSIPrefActiveAssignments for each SI protected by SG2, plus one for the planned increase. The RM Adjustor 114 compares this number with the capacity available on service provider side, which is the product of the attribute values SG2.saAmfSGNumPrefAssignedSUs and SG2.saAmfSGMaxActiveSIsperSU. In this example, the RM Adjustor 114 calculates the available capacity to be 6 and the requested capacity after adding one for planned increase to be 5. Since the available capacity is sufficient for an additional assignment, the RM Adjustor 114 increments SI3.saAmfSIPrefActiveAssignments. As a result, AMF assigns SI3 to SU6 of SG2 as shown in (B) of FIG. 10.

Figure 11:
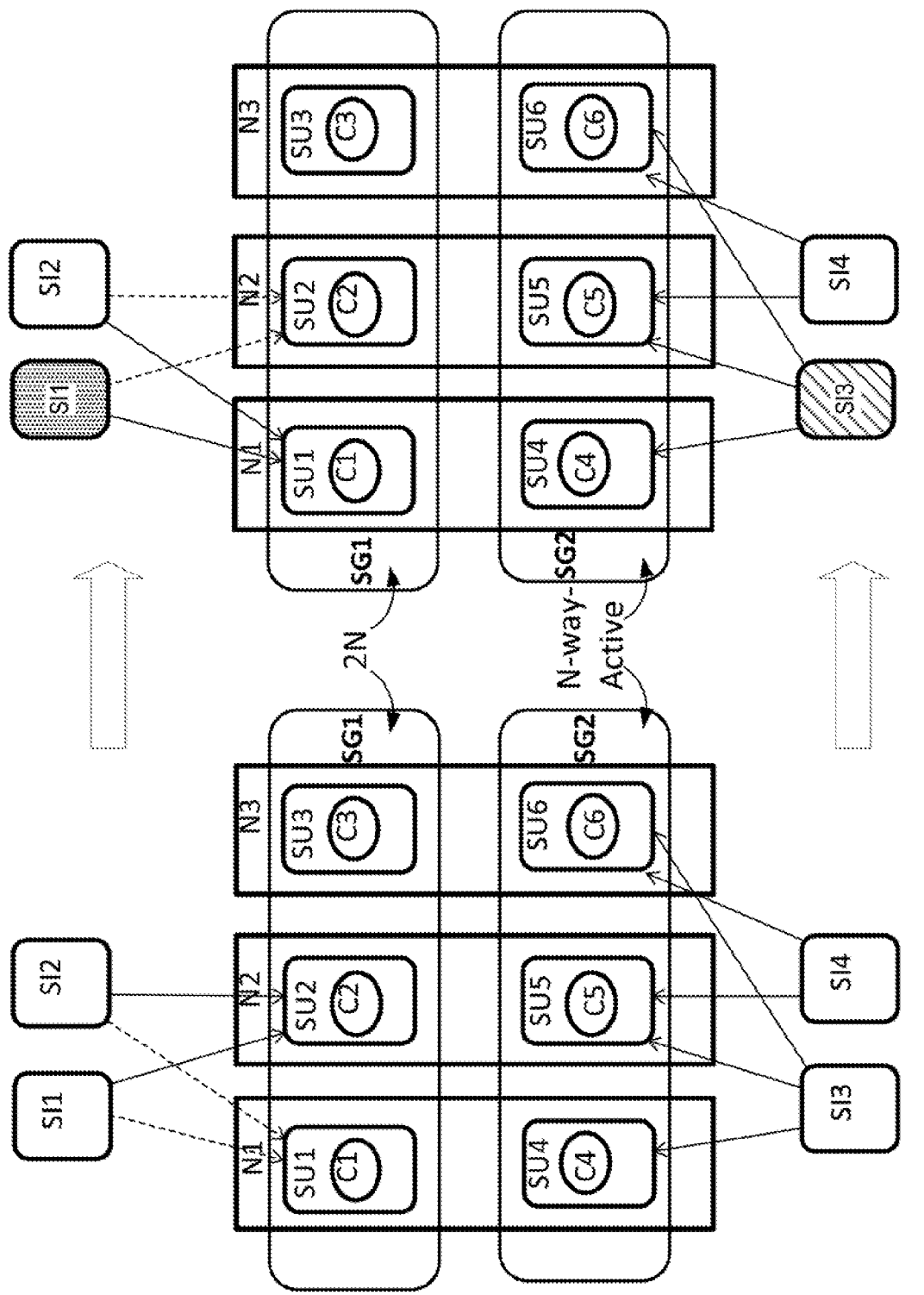
FIG. 11 illustrates an example of using the third strategy of FIG. 5 for handling SI-workload increase according to one embodiment.

FIG. 11 illustrates another example of configuration change in response to SI-workload increase according to one embodiment. In this example, the workload of SI3 (the same SI3 as in the example of FIG. 10) continues to increase and the Elasticity Controller 112 receives a new signal for the workload increase in SI3. The redundancy model used by the SG (i.e., SG2) protecting SI3 is the N-way-Active redundancy model.

The RM Adjustor 114 for N-way Active checks the first condition: whether SI3 of SG2 is already assigned capacity on all nodes. In this example, SI3.saAmfSIPrefActiveAssignments is equal to SG2.saAmfSGNumPrefActiveSUs of SG2. Hence, the RM Adjustor 114 checks the second condition: whether it can increase the number of assigned SUs of SG2. The number of SG2.saAmfSGNumPrefAssignedSUs is equal to SG2.saAmfSGNumPrefInserviceSUs, i.e., all of the SUs of SG2 have been used. Therefore, the RM Adjustor 114 informs the Elasticity Controller 112 to try on other SGs in the cluster; e.g., using a cluster-level strategy. The RM Adjustor 114 also calls the Buffer Manager 116 to adjust the buffers for SG2.

The Elasticity Controller 112 searches for other SGs in the cluster sharing nodes with SG2. The Elasticity Controller 112 obtains the name of the nodes which is hosting the SUs that are currently handling an active assignment of SI3. In the example, the Elasticity Controller 112 finds that N1, N2 and N3 are the shared nodes. Therefore, the Elasticity Controller 112 selects the first node (i.e., N1) and searches for the SUs hosted on N1 other than those of SG2. In the example, SU1 of SG1 is also hosted by N1. The Elasticity Controller 112 obtains the SIs handled by SU1 of SG1 by reading the SU1.saAmfSUAssignedSIs attribute, which indicates SI1 and SI2 of SG1. The Elasticity Controller 112 selects SD and identifies that SG1 uses 2N redundancy model. Thus, the RM Adjustor 114 for 2N is called, which reacts as if the workload of SI1 has increased.

The RM Adjustor 114 uses the third strategy for SI-workload increase to prioritize the SU on the least loaded node. The RM Adjustor 114 finds that N2, which handles the active assignment of SI1, is the most loaded node in terms of active assignments and N1 is the least loaded. Hence, the RM Adjustor 114 swaps the rank of the SUs in SG1; i.e., the ordered list of SUs in SG1 becomes: {SU1, SU2, SU3}, which results in AMF swapping the assignments of SI1 and SI2 between SU1 and SU2.

Meanwhile, the Buffer Manager 116 attempts to perform buffer management using the strategy described and shown in connection with FIG. 9. It determines that there are no more nodes it could use for SG2. It signals this result to the Elasticity Controller 112, which in turn notifies the system administration of the need of new nodes.

The following illustrates an example of SI-number increase. The configuration for SG1 and SG2 are as follows.

| SG1 | | |
|---|---|---|
| | Redundancy Model | N + M redundancy model |
| | Ordered List of SUs in SG | {SU1, SU2, SU3} |
| | Ordered List of SIs | {SI1, SI2} |
| | saAmfSGNumPrefInserviceSUs | 3 |
| | saAmfSGNumPrefActiveSUs | 1 |
| | saAmfSGNumPrefStandbySUs | 1 |
| | saAmfSGMaxActiveSIsperSU | 2 |
| | saAmfSGMaxStandbySIsperSU | 2 |
| | saAmfSGAutoAdjust | SA_TRUE |
| | Component capability model | 2_active_or_4_standby |

| SG2 | | |
|---|---|---|
| | Redundancy Model | N-way-Active redundancy model |
| | Ordered List of SUs in SG1 | {SU4, SU5, SU6} |
| | Ordered List of SIs | {SI3, SI4} |
| | saAmfSGNumPrefInserviceSUs | 3 |
| | saAmfSGMaxActiveSIsperSU | 2 |
| | saAmfSGAutoAdjust | SA_TRUE |
| | Component capability model | 2_active |
| | SI3.saAmfSIPrefActiveAssignments | 2 |
| | SI4.saAmfSIPrefActiveAssignments | 2 |

Assume that the above configuration is changed by adding a new SI (i.e., SI5) to be protected by SG1. The configuration is changed in IMM and IMM signals this change to the Elasticity Controller 112 of the Elasticity Engine 110. The Elasticity Controller 112 determines that SI5 is to be protected by SG1, which has the N+M redundancy model, and calls the RM Adjustor 114 for N+M.

To handle the SI-number increase, the RM Adjustor 114 uses the second strategy (for SI-workload increase) of distributing the SIs over more SUs. Accordingly, the RM Adjustor 114 checks the first condition: whether there is capacity in SG1 to serve SI5; i.e., it compares the number of active and standby assignments that SG1 can take with the number of SIs it needs to protect. On the active side in this example there is only one SU configured, which can take two assignments. SI5 would be the third SI to protect. Therefore, the SG's capacity is to be increased. The RM Adjustor 114 checks the second condition: whether the number SG1.saAmfSGNumPrefActiveSUs: 2 can be increased. The answer is yes, since it is less than the attribute value SG1.saAmfSGNumPrefInserviceSUs: 3. Therefore, the RM Adjustor 114 increments SG1.saAmfSGNumPrefActiveSUs to 3, and calls the Buffer Manager 116 to adjust the buffers as necessary.

Figure 12:
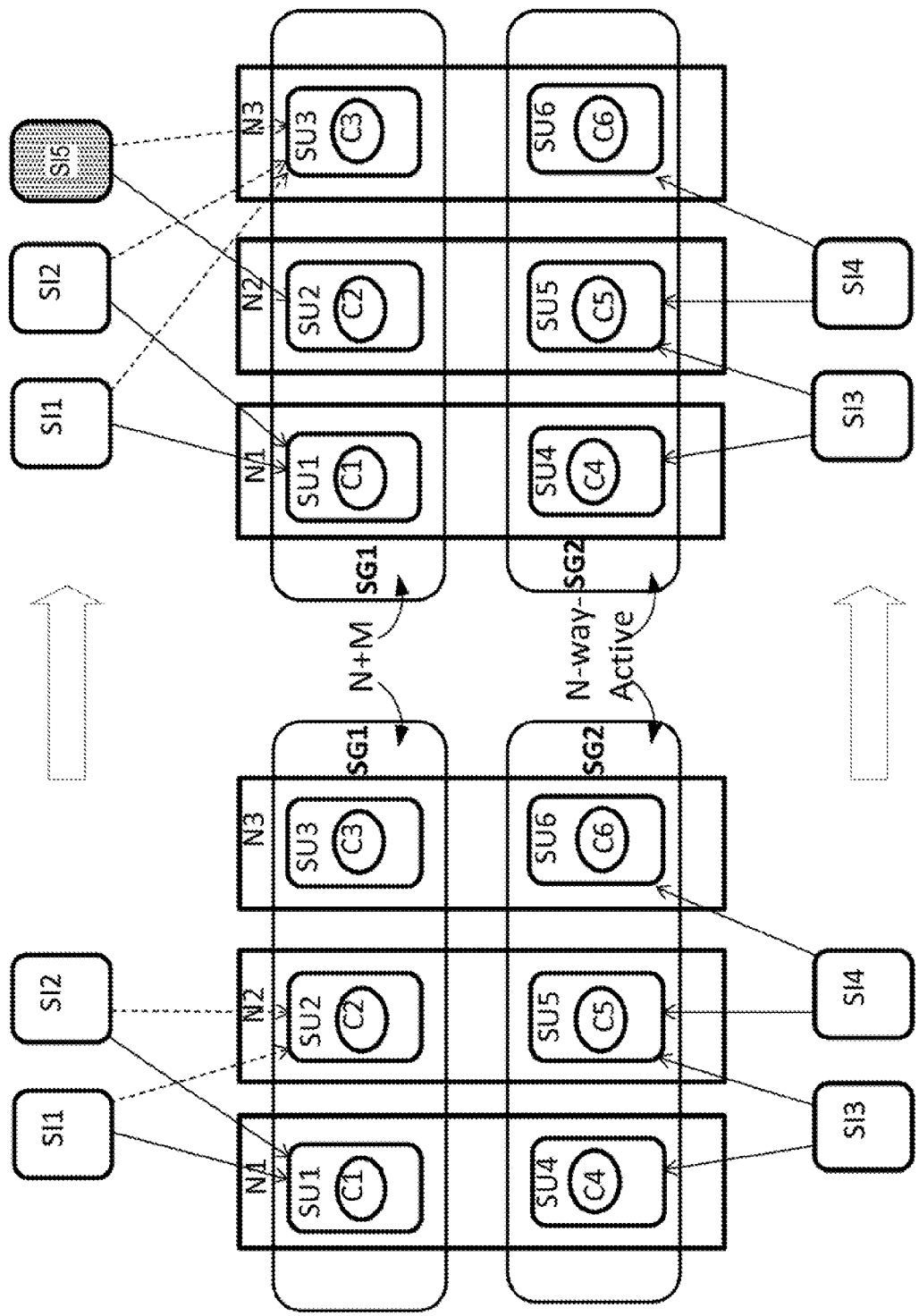
FIG. 12 illustrates an example of using the second strategy of FIG. 4 for handling SI-number increase according to one embodiment.

The RM Adjustor 114 performs a similar check for the standby side, where no adjustment is needed as the current single standby can accommodate the new SI's assignment. The RM Adjustor 114 signals the success of configuration change to the Elasticity Controller 112. Thus, AMF assigns SI5 to SU2 in the active role and to SU3 in the standby role as shown in the example of FIG. 12.

Meanwhile, the Buffer Manager 116 detects that there are no more nodes for SG1 to use. Therefore, it cannot adjust the buffers. The Buffer Manager 116 reports this to the Elasticity Controller, which notifies the system administration.

Figure 13:
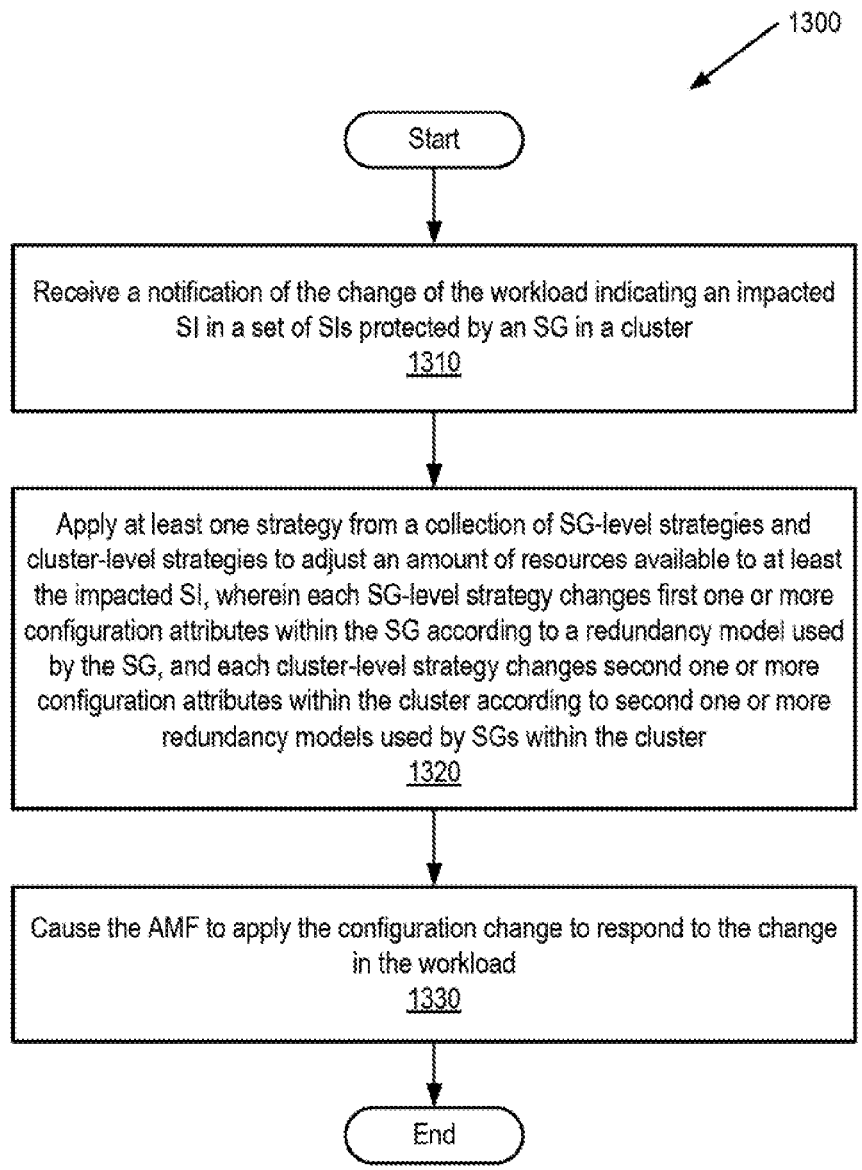
FIG. 13 is a flow diagram illustrating a method for dynamically responding to a work change according to one embodiment of the invention.

FIG. 13 is a flow diagram illustrating a computer-implemented method 1300 for dynamically responding to a change in a workload managed by AMF. The response is dynamic in that the response is made in runtime while the workload changes. The workload is represented by a set of SIs protected by an SG in a cluster. In one embodiment, the method 1300 begins with receiving a notification of the change in the workload indicating an impacted SI in the set of SIs (1310). The method 1300 further applies at least one strategy from a collection of SG-level strategies and cluster-level strategies (e.g., an SG-level strategy or a cluster-level strategy, or a combination of both) to adjust an amount of resources available to at least the impacted SI (1320). Each SG-level strategy changes first one or more configuration attributes within the SG according to a redundancy model used by the SG, and each cluster-level strategy changes second one or more configuration attributes within the cluster according to one or more redundancy models used by SGs within the cluster. The method 1300 then causes the AMF to apply the configuration change to respond to the change in the workload (1330), e.g., AMF performs SI to SU assignments based on the changed configuration attributes, such as the elasticity attributes described above.

The method 1300 may be performed by hardware (e.g., circuitry, dedicated logic, programmable logic, microcode, etc.), software (e.g., instructions run on a processing device), or a combination thereof. In one embodiment, the method 1300 may be performed by a system 1400 of FIG. 14 and/or by a computer system 1500 of FIG. 15.

Figure 14:
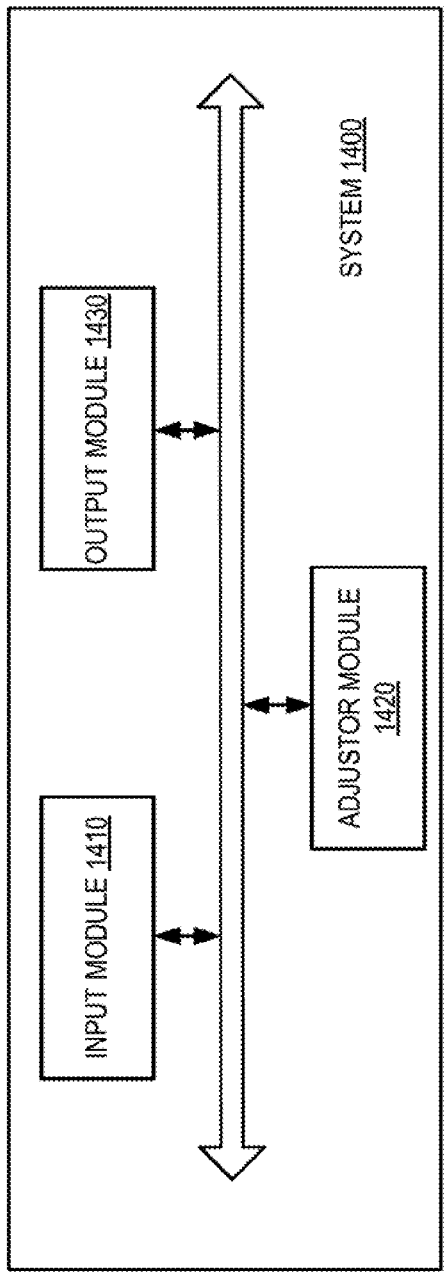
FIG. 14 illustrates a diagrammatic representation of a system for dynamically responding to a workload change according to one embodiment of the invention.

FIG. 14 illustrates a system 1400 adapted or operative to dynamically respond to a change in a workload managed by AMF according to one embodiment. The workload is represented by a set of SIs protected by an SG in a cluster. In one embodiment, the system 1400 performs the method 1300 of FIG. 13.

In one embodiment, the system 1400 comprises an input module 1410 configured to receive a notification of the change in the workload indicating an impacted SI in the set of SIs. The system 1400 further comprises an adjustor module 1420 configured to apply at least one strategy from a collection of SG-level strategies and cluster-level strategies to adjust an amount of resources available to at least the impacted SI. Each SG-level strategy changes first one or more configuration attributes within the SG according to a redundancy model used by the SG, and each cluster-level strategy changes second one or more configuration attributes within the cluster according to one or more redundancy models used by SGs within the cluster. The system 1400 further comprises an output module 1430 configured to cause the AMF to apply the configuration change to respond to the change in the workload. In one embodiment, the system 1400 may be the Elasticity Engine 110 of FIG. 1, where the operations of the adjustor module 1420 may be performed by the RM adjustors 114, and the operations of the input module 1410 and/or the output module 1430 may be performed by the Elasticity Controller 112.

Figure 15:
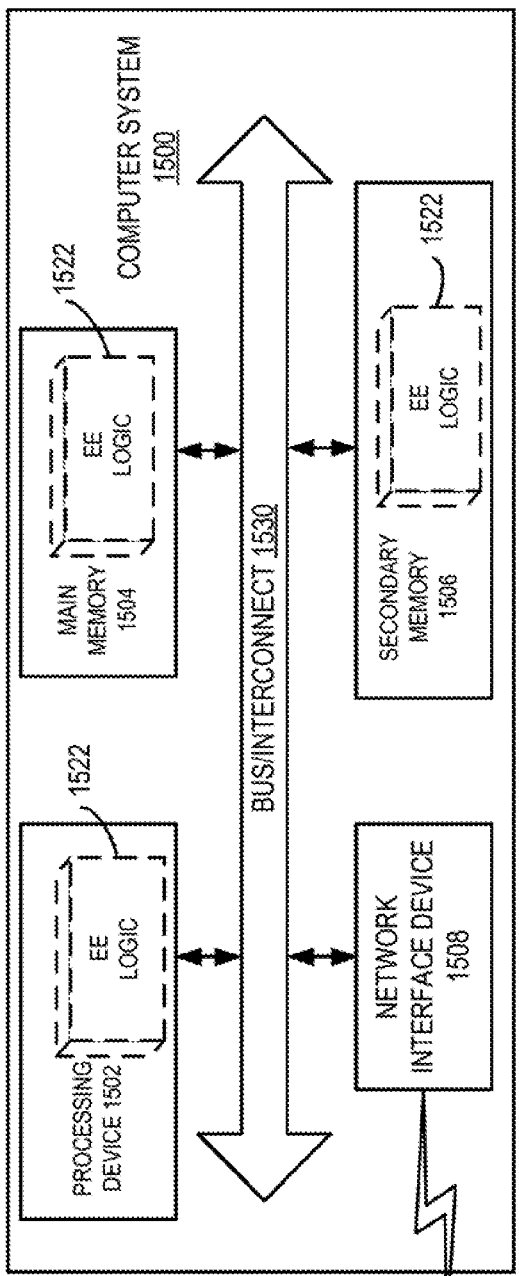
FIG. 15 illustrates a diagrammatic representation of a computer system according to one embodiment of the invention.

FIG. 15 illustrates a diagrammatic representation of a machine in the exemplary form of the computer system 1500 within which a set of instructions, for causing the machine to perform any one or more of the methodologies discussed herein, may be executed. In one embodiment, the computer system 1500 may be part of a network node (e.g., a router, switch, bridge, controller, base station, etc.). In one embodiment, the computer system 1500 may operate in a cloud computing environment where multiple server computers in one or more service centers collectively provide computing services on demand. The computer system 1500 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1500 includes a processing device 1502. The processing device 1502 represents one or more general-purpose processors, each of which can be: a microprocessor, a central processing unit (CPU), a multicore system, or the like. The processing device 1502 may also be one or more special-purpose processing devices such as an application specific integrated circuit (ASIC), a field programmable gate array (FPGA), a digital signal processor (DSP), network processor, or the like. In one embodiment, the processing device 1502 is adapted or operative to execute the operations of an Elasticity Engine (EE) logic 1522 which contains instructions executable by the processing device 1502 to perform the method 1300 of FIG. 13.

In one embodiment, the processor device 1502 is coupled to one or more memory devices such as: a main memory 1504 (e.g., read-only memory (ROM), flash memory, dynamic random access memory (DRAM), etc.), a secondary memory 1506 (e.g., a magnetic data storage device, an optical magnetic data storage device, etc.), and other forms of computer-readable media, which communicate with each other via a bus or interconnect 1530. The memory devices may also include different forms of read-only memories (ROMs), different forms of random access memories (RAMs), static random access memory (SRAM), or any type of media suitable for storing electronic instructions. In one embodiment, the memory devices may store the code and data of the EE logic 1522. In the embodiment of FIG. 15, the EE logic 1522 may be located in one or more of the locations shown as dotted boxes and labeled by the reference numeral 1522. In alternative embodiments the EE logic 1522 may be located in other location(s) not shown in FIG. 15.

In one embodiment, the computer system 1500 is adapted or operative to perform the method 1300 of FIG. 13 for dynamically responding to a change of workload managed by AMF. In one embodiment, the processing device 1502, having one or more processors coupled to the memory devices that stores a configuration, is adapted or operative to receive a notification of the change in the workload indicating an impacted SI in the set of SIs, to apply at least one strategy from a collection of SG-level strategies and cluster-level strategies to adjust an amount of resources available to at least the impacted SI, and to cause the AMF to apply the configuration change to respond to the change in the workload. In one embodiment, each SG-level strategy changes first one or more configuration attributes within the SG according to a redundancy model used by the SG, and each cluster-level strategy changes second one or more configuration attributes within the cluster according to one or more redundancy models used by SGs within the cluster.

The computer system 1500 may further include a network interface device 1508. A part or all of the data and code of the EE logic 1522 may be transmitted or received over a network 1520 via the network interface device 1508.

In one embodiment, the EE logic 1522 can be implemented using code and data stored and executed on one or more computer systems (e.g., the computer system 1500). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the flow diagrams of FIGS. 2 and 13 have been described with reference to the exemplary embodiments of FIGS. 1, 14 and 15. However, it should be understood that the operations of the flow diagrams of FIGS. 2 and 13 can be performed by embodiments of the invention other than those discussed with reference to FIGS. 1, 14 and 15, and the embodiments discussed with reference to FIGS. 1, 14 and 15 can perform operations different than those discussed with reference to the flow diagrams. While the flow diagrams of FIGS. 2 and 13 show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A computer-implemented method for dynamically responding to a change in a workload managed by Availability Management Framework (AMF), wherein the workload is represented by a set of service instances (SIs) assigned to service units (SUs) of a first service group (SG) hosted on nodes of a cluster, wherein the first SG uses a redundancy model to protect the set of SIs and shares one or more nodes with one or more other SGs, the method comprising the steps of:

receiving a notification of the change in the workload indicating the type of workload change and an impacted SI in the set of SIs;

selecting, based on the type of workload change and the redundancy model used by the first SG, a strategy from a collection of SG-level strategies and cluster-level strategies to accommodate the change in the workload by adjusting an amount of resources available to at least the impacted SI, wherein each SG-level strategy changes first one or more configuration attributes within the first SG according to the redundancy model used by the first SG, and wherein each cluster-level strategy changes second one or more configuration attributes within one or more of the other SGs according to respective redundancy models used by the other SGs within the cluster, wherein the selecting comprises selecting from the cluster-level strategies in response to determining that none of the SG-level strategies can accommodate the change in the workload; and causing the AMF to apply configuration changes to configuration attributes in accordance with the selected strategy to respond to the change in the workload.

2. The method of claim 1, wherein the selected strategy is one of a SG-level strategy or a each cluster-level strategy which adjusts the number of SIs that can share one of the nodes.

3. The method of claim 1, further comprising the step of: maintaining a configurable number of in-service SUs for the SG in the cluster of SGs which have assignments on the same node, wherein the in-service SUs have been instantiated and have not been assigned to the set of SIs.

4. The method of claim 1, further comprising the step of: maintaining one or more uninstantiated Service Units (SUs) for the SG in the cluster of SGs, wherein the uninstantiated SUs have been configured for the AMF and have not been instantiated.

5. The method of claim 1, wherein the selected strategy is one of a SG-level strategy or that includes changing the number of active assignments for the impacted SI when the redundancy model used by the first SG is an N-way-Active redundancy model or a cluster-level strategy that includes changing the number of active assignments for another SI, protected by one of the other SGs, which share a node with the impacted SI when the redundancy model used by the SG protecting the another SI is an N-way-Active redundancy model.

6. The method of claim 1, wherein a change of workload volume of the impacted SI, the SG-level strategy or the cluster-level strategy includes changing the number of SUs within the SG that can be assigned to the set of SIs when the redundancy model used by the SG is neither of a 2N redundancy model and a No-Redundancy redundancy model.

7. The method of claim 1, wherein based on the type of workload change being a change that adds the impacted SI, the selected SG-level strategy includes increasing the number of SUs within the SG that can be assigned to the set of SIs.

8. The method of claim 1, wherein the each SG-level strategy from the SG-level strategies or the each cluster-level strategy from the cluster-level strategies includes changing a ranking of SUs within the SG to move the workload of the impacted SI from one node to another node.

9. A system adapted to dynamically respond to a change in a workload managed by Availability Management Framework (AMF), wherein the workload is represented by a set of service instances (SIs) assigned to service units (SUs) of a first service group (SG) hosted on nodes of a cluster, wherein the first SG uses a redundancy model to protect the set of Sis and shares one or more nodes with one or more other SGs, the system comprising:

memory to store a configuration; and one or more processors coupled to the memory, the one or more processors adapted to:

receive a notification of the change in the workload indicating the type of workload change and the impacted SI in the set of SIs;

select, based on the type of workload change and the redundancy model used by the first SG, a strategy from a collection of SG-level strategies and cluster-level strategies to accommodate the change in the workload by adjusting an amount of resources available to at least the impacted SI, wherein each SG-level strategy changes first one or more configuration attributes within the first SG according to the redundancy model used by the first SG, and wherein each cluster-level strategy changes second one or more configuration attributes within one or more of the other according to respective redundancy models used by the other SGs within the cluster, wherein the select comprises select from the cluster-level strategies in response to determining that none of the SG-level strategies can accommodate the change in the workload; and cause the AMF to apply configuration changes to configuration attributes in accordance with the selected strategy to respond to the change in the workload.

10. The system of claim 9, wherein the selected strategy is one of a SG-level strategy or a each cluster-level strategy which adjusts the number of SIs.

11. The system of claim 9, wherein the one or more processors are further adapted to maintain a configurable number of in-service SUs for the SG in the cluster of SGs which have assignments on the same node, wherein the in-service SUs have been instantiated and have not been assigned to the set of SIs.

12. The system of claim 9, further the one or more processors are further adapted to maintain one or more uninstantiated Service Units (SUs) for the SG, wherein the uninstantiated SUs have been configured for the AMF and have not been instantiated.

13. The system of claim 9, wherein the selected strategy is one of a SG-level strategy or that includes changing the number of active assignments for the impacted SI when the redundancy model used by the first SG is an N-way-Active redundancy model or a cluster-level strategy that includes changing the number of active assignments for another SI, protected by one of the other SGs, which share a node with the impacted SI when the redundancy model used by the SG protecting the another SI is an N-way-Active redundancy model.

14. The system of claim 9, wherein, a change of workload volume of the impacted SI, the SG-level strategy or the cluster-level strategy includes changing the number of SUs within the SG that can be assigned to the set of SIs when the redundancy model used by the SG is neither of a 2N redundancy model and a No-Redundancy redundancy model.

15. The system of claim 9, wherein, based on the type of workload change being a change that adds the impacted SI, the selected SG-level strategy includes increasing the number of SUs within the SG that can be assigned to the set of SIs.

16. The system of claim 9, wherein the each SG-level strategy from the SG-level strategies or the each cluster-level strategy from the cluster-level strategies includes changing a ranking of SUs within the SG to move the workload of the impacted SI from one node to another node.

* * * * *